United States Patent
Kim et al.

(10) Patent No.: US 8,259,602 B2
(45) Date of Patent: Sep. 4, 2012

(54) METHOD OF TRANSMITTING CONTROL SIGNAL IN WIRELESS COMMUNICATION SYSTEM

(75) Inventors: Hak Seong Kim, Anyang-si (KR); Bong Hoe Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 655 days.

(21) Appl. No.: 12/427,555

(22) Filed: Apr. 21, 2009

(65) Prior Publication Data

US 2009/0290538 A1 Nov. 26, 2009

Related U.S. Application Data

(60) Provisional application No. 61/046,777, filed on Apr. 21, 2008, provisional application No. 61/073,034, filed on Jun. 17, 2008.

(30) Foreign Application Priority Data

Feb. 25, 2009 (KR) ........................ 10-2009-0016036

(51) Int. Cl.
*G08C 15/00* (2006.01)
*H04W 4/00* (2009.01)
*H04J 1/00* (2006.01)

(52) U.S. Cl. .................. 370/252; 370/328; 370/480
(58) Field of Classification Search .................. None
See application file for complete search history.

(56) References Cited

U.S. PATENT DOCUMENTS

| | | | | |
|---|---|---|---|---|
| 2008/0310540 A1* | 12/2008 | Tiirola et al. | ............... | 375/267 |
| 2009/0232065 A1* | 9/2009 | Zhang et al. | ............... | 370/329 |
| 2009/0232067 A1* | 9/2009 | Pajukoski et al. | ........... | 370/329 |

FOREIGN PATENT DOCUMENTS

| | | |
|---|---|---|
| EP | 1895733 | 3/2008 |
| WO | 2007095102 | 8/2007 |
| WO | 2008009011 | 1/2008 |

OTHER PUBLICATIONS

U.S. Appl. No. 61/067,313, Tiirola et al., ACK/NACK Channelization for Resource Blocks Containing Both ACK/NACK and CQI; Feb. 26, 2008, pp. 1-14.*
U.S. Appl. No. 61/064,590, Zhang et al., Method of Assigning Resource for the Uplink Control Channel in LTE, pp. 4-5.*

* cited by examiner

*Primary Examiner* — Gregory Sefcheck
*Assistant Examiner* — Ashley Shivers
(74) *Attorney, Agent, or Firm* — Lee, Hong, Degerman, Kang & Waimey

(57) ABSTRACT

A method of transmitting a control signal in a wireless communication system is provided. The method includes acquiring a resource index, the number of cyclic shifts (CSs) and a CS interval, wherein the number of CSs is an integer multiple of the CS interval, determining a CS index based on the number of CSs and the CS interval, generating a cyclically shifted sequence by cyclically shifting a base sequence by a CS amount obtained from the CS index, generating a modulated sequence based on the cyclically shifted sequence and a symbol for a control signal and transmitting the modulated sequence after mapping the modulated sequence to a resource block obtained from the resource index.

8 Claims, 15 Drawing Sheets

METHOD OF TRANSMITTING CONTROL SIGNAL IN WIRELESS COMMUNICATION SYSTEM

CROSS-REFERENCE TO RELATED APPLICATIONS

This application claims the benefit of priority of U.S. Provisional application Ser. No. 61/046,777 filed on Apr. 21, 2008, U.S. Provisional application Ser. No. 61/073,034 filed on Jun. 17, 2008, and Korean Patent Application No. 2009-0016036 filed on Feb. 25, 2009, which are incorporated by reference in their entirety herein.

FIELD OF THE INVENTION

The present invention relates to wireless communications, and more particularly, to a method of transmitting a control signal in a wireless communication system.

DESCRIPTION OF THE RELATED ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

In general, the wireless communication system is a multiple access system capable of supporting communication with multiple users by sharing available radio resources. Examples of the radio resource include a time, a frequency, a code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc. The radio resource is a time in the TDMA system, a code in the CDMA system, and a subcarrier and a time in the OFDM system.

While having almost the same complexity with the OFDMA, SC-FDMA has a lower peak-to-average power ratio (PAPR) due to a single carrier property. Since the low PAPR is advantageous for a user equipment (UE) in terms of transmission power efficiency, the SC-FDMA is adopted for uplink transmission in a $3^{rd}$ generation partnership project (3GPP) long term evolution (LTE) as disclosed in section 5 of the 3GPP TS 36.211 V8.2.0 (2008-03) "Technical Specification Group Radio Access Network; Evolved Universal Terrestrial Radio Access (E-UTRA); Physical channels and modulation (Release 8)".

Meanwhile, a variety of uplink control signal is transmitted on an uplink control channel. Examples of the uplink control signal include a hybrid automatic repeat request (HARQ) acknowledgement (ACK)/not-acknowledgement (NACK) signal, a channel quality indicator (CQI) indicating downlink channel quality, a scheduling request (SR) requesting resource allocation for uplink transmission, etc.

A plurality of UEs in a cell may simultaneously transmit uplink control signals to a base station (BS). The BS must be able to distinguish the uplink control signals simultaneously transmitted from the respective UEs. When the uplink control signals of the respective UEs are transmitted using different frequencies, the BS can distinguish the uplink control signals. The plurality of UEs in the cell may transmit the uplink control signals to the BS by using the same time-frequency resource. To distinguish the uplink control signals transmitted from the respective UEs by using the same time-frequency resource, the respective UEs may use orthogonal sequences in the transmission of the uplink control signals. Alternatively, the UEs may use low correlation sequences. However, the number of orthogonal sequences or the number of low correlation sequences is limited. That is, not only frequency but also orthogonal sequences or low correlation sequences is an important resource for wireless communication. If limited resources are not properly allocated to the respective UEs, system performance may deteriorate.

Accordingly, there is a need for a method of transmitting an uplink control signal for the effective use of limited resources.

SUMMARY OF THE INVENTION

The present invention provides a method of transmitting a control signal in a wireless communication system.

In one aspect, a method of transmitting a control signal in a wireless communication system, carried in a user equipment (UE), is provided. The method includes acquiring a resource index, the number of cyclic shifts (CSs) and a CS interval, wherein the number of CSs is an integer multiple of the CS interval, determining an orthogonal sequence (OS) index based on the number of CSs and the CS interval, determining a CS index based on the number of CSs and the CS interval, generating a cyclically shifted sequence by cyclically shifting a base sequence by a CS amount obtained from the CS index, generating a modulated sequence based on the cyclically shifted sequence and a symbol for a control signal, generating a spread sequence by spreading the modulated sequence with an OS obtained from the OS index and transmitting the spread sequence after mapping the spread sequence to a resource block obtained from the resource index.

Preferably, the number of CSs is the number of CSs used in the resource block in which a control signal of other UE is multiplexed.

Preferably, the type of the control signal is different from the type of the control signal of the other UE.

Preferably, the control signal is a hybrid automatic repeat request (HARQ) acknowledgement (ACK)/not-acknowledgement (NACK) signal and the control signal of the other UE is a channel quality indicator (CQI).

Preferably, the control signal is a scheduling request (SR) and the control signal of the other UE is a CQI.

Preferably, the control signal is transmitted on a physical uplink control channel (PUCCH).

Preferably, the CS interval is a minimum interval between two adjacent CSs which are reserved for PUCCHs.

Preferably, the number of CSs and the CS interval are received from a base station (BS).

Preferably, the resource index is received from a BS.

Preferably, the control signal is an HARQ ACK/NACK signal for downlink data, and the resource index is acquired from a radio resource for a physical control channel to receive the downlink data.

Preferably, the resource block comprises a plurality of subcarriers and a plurality of single carrier-frequency division multiple access (SC-FDMA) symbols.

Preferably, the OS index is determined based on the number of CSs, the CS interval and the resource index.

Preferably, the CS index is determined based on the number of CSs, the CS interval, the resource index and the OS index.

Preferably, the modulated sequence is generated by multiplying the cyclically shifted sequence by the symbol for the control signal.

In another aspect, an apparatus for a wireless communication is provided. The apparatus includes a signal generator configured to generate and transmit a radio signal and a processor coupled with the signal generator and configured to acquire a resource index, the number of CSs and a CS interval, wherein the number of CSs is an integer multiple of the CS interval, determine a CS index based on the number of CSs and the CS interval, generate a cyclically shifted sequence by cyclically shifting a base sequence by a CS amount obtained from the CS index, generate a modulated sequence based on the cyclically shifted sequence and a symbol for control signal and transmit the modulated sequence after mapping the modulated sequence to a resource block obtained from the resource index.

In still another aspect, a method of transmitting a control signal on an uplink control channel in a wireless communication system is provided. The method includes configuring an uplink control channel and transmitting a control signal on the uplink control channel, wherein the uplink control channel is configured by a cyclically shifted sequence and an OS, each of the cyclically sequence and the OS is generated by using the number of CSs and a CS interval, and the number of CSs is an integer multiple of the CS interval.

A method of effectively transmitting a control signal is provided. Therefore, overall system performance can be improved.

DETAILED DESCRIPTION OF THE INVENTION

The technique described below can be used in various wireless access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/ General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink.

For clarity, the following description will focus on the 3GPP LTE. However, the technical features of the present invention are not limited thereto.

Figure 1:
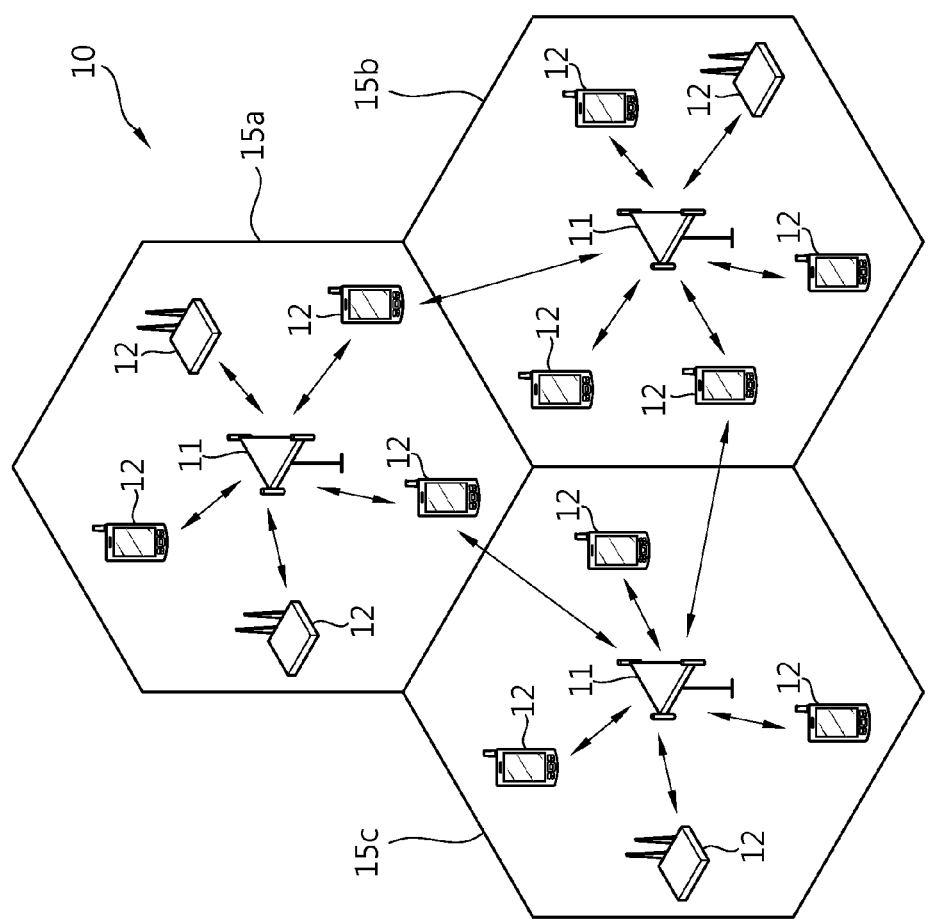
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

The wireless communication system can support a UL and/or DL hybrid automatic repeat request (HARQ). In addition, a channel quality indicator (CQI) can be used for link adaptation.

Figure 2:
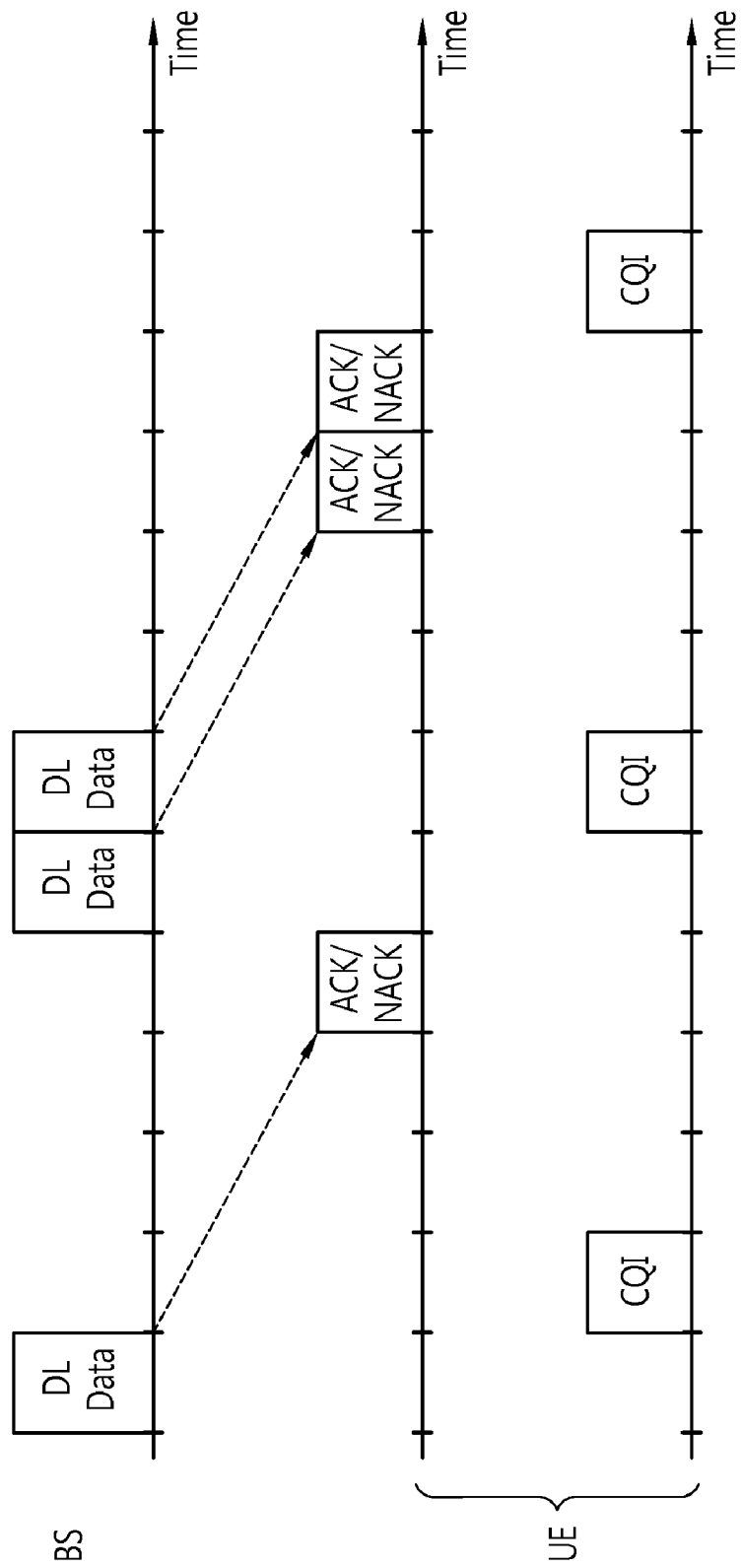
FIG. 2 shows transmission of a hybrid automatic repeat request (HARQ) acknowledgement (ACK)/not-acknowledgment (NACK) signal and a channel quality indicator (CQI).

FIG. 2 shows transmission of a HARQ acknowledgement (ACK)/not-acknowledgment (NACK) signal and a CQI.

Referring to FIG. 2, upon receiving DL data from a BS, a UE transmits the HARQ ACK/NACK signal after a specific time elapses. The DL data may be transmitted on a physical downlink shared channel (PDSCH) indicated by a physical downlink control channel (PDCCH). The HARQ ACK/ NACK signal is an ACK signal when the DL data is successfully decoded. The HARQ ACK/NACK signal is a NACK signal when the DL data is unsuccessfully decoded. Upon receiving the NACK signal, the BS can retransmit the DL data until the ACK signal is received or until retransmission is performed the number of times corresponding to a maximum number of retransmissions.

Resource allocation or a transmission time of the HARQ ACK/NACK signal for the DL data may be dynamically reported by the BS by using signaling, or may be predetermined according to the resource allocation or the transmission time of the DL data. For example, in a frequency division duplex (FDD) system, if the PDSCH is received in an $n^{th}$ subframe, the HARQ ACK/NACK signal for the PDSCH can be transmitted on a physical uplink control channel (PUCCH) in an $(n+4)^{th}$ subframe.

The UE can report a CQI periodically and/or a periodically to the BS by measuring a DL channel condition. The BS can perform DL scheduling by using the CQI. The BS can report a CQI transmission time or resource allocation information to the UE.

Figure 3:
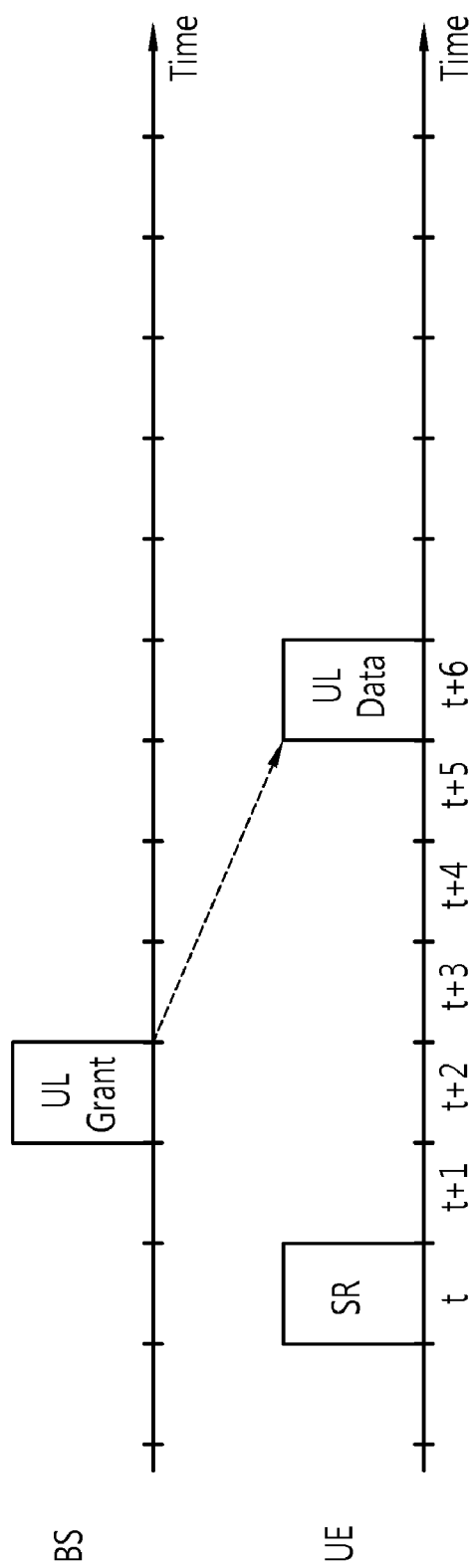
FIG. 3 shows uplink transmission.

FIG. 3 shows UL transmission.

Referring to FIG. 3, for UL transmission, a UE first transmits a scheduling request (SR) to a BS. The SR is used when the UE requests the BS to allocate a UL radio resource. The SR is a sort of preliminary information exchange for data exchange. In order for the UE to transmit UL data to the BS, radio resource allocation is first requested by using the SR. The BS can report an SR transmission time or resource allocation information to the UE.

In response to the SR, the BS transmits a UL grant to the UE. The UL grant may be transmitted on a PDCCH. The UL grant includes UL radio resource allocation. The UE transmits the UL data by using an allocated radio resource.

As shown in FIGS. 2 and 3, the UE can transmit a UL control signal (i.e., HARQ ACK/NACK signal, CQI, and SR) at a given transmission time. The type and size of the control signal may vary depending on systems, and the technical features of the present invention are not limited thereto.

Figure 4:
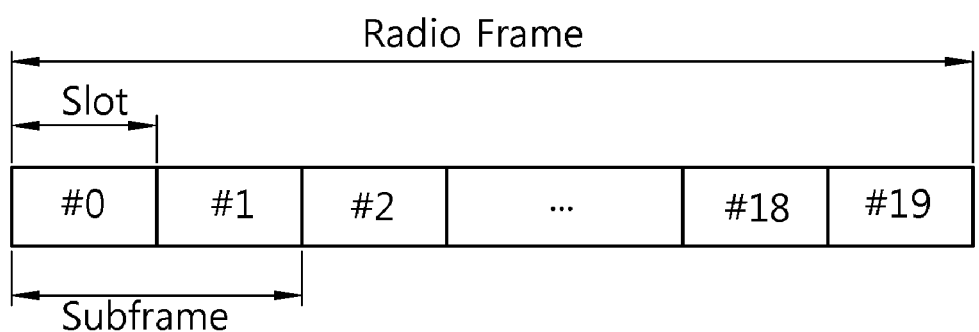
FIG. 4 shows a structure of a radio frame in a $3^{rd}$ generation partnership project (3GPP) long term evolution (LTE).

FIG. 4 shows a structure of a radio frame in a 3GPP LTE.

Referring to FIG. 4, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is shown for exemplary purposes only. Thus, the number of subframes included in the radio frame or the number of slots included in the subframe may change variously.

Figure 5:
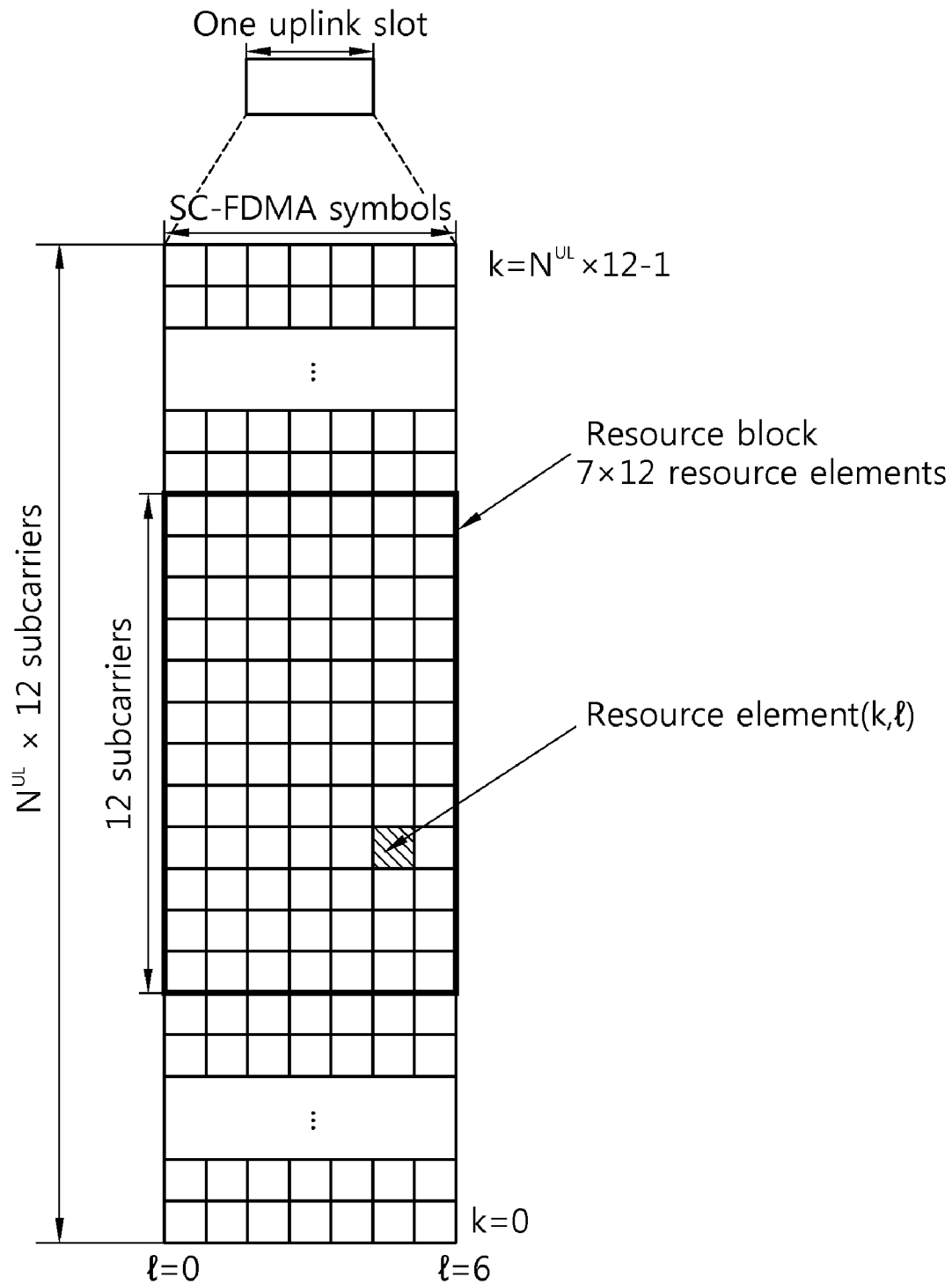
FIG. 5 shows an example of a resource grid for one uplink slot in a 3GPP LTE.

FIG. 5 shows an example of a resource grid for one UL slot in a 3GPP LTE.

Referring to FIG. 5, the UL slot includes a plurality of SC-FDMA symbols in a time domain and $N^{UL}$ resource blocks (RBs) in a frequency domain. The SC-FDMA symbol is for expressing one symbol period, and may be referred to as an OFDMA symbol or a symbol duration according to systems. The RB is a resource allocation unit and includes a plurality of subcarriers in the frequency domain. The number of RBs $N^{UL}$ included in the UL slot depends on a UL transmission bandwidth configured in a cell. In the 3GPP LTE, the number $N^{UL}$ may be any one value in the range of 60 to 110.

Each element on the resource grid is referred to as a resource element. The resource element on the resource grid can be identified with an index pair (k, f) within a slot. Herein, $k(k=0, \ldots, N^{UL} \times 12-1)$ denotes a subcarrier index in the frequency domain, and $l(l=0, \ldots, 6)$ denotes an SC-FDMA symbol index in the time domain.

Although it is described herein that one RB includes 7×12 resource elements consisting of 7 SC-FDMA symbols in the time domain and 12 subcarriers in the frequency domain, this is for exemplary purposes only. Thus, the number of SC-FDMA symbols and the number of subcarriers in the RB are not limited thereto. The number of subcarriers or the number of SC-FDMA symbols included in the RB may change variously. The number of SC-FDMA symbols may change according to a length of a cyclic prefix (CP). For example, when a normal CP is used, the number of SC-FDMA symbols is 7, and when an extended CP is used, the number of SC-FDMA symbols is 6.

The resource grid for one UL slot for the 3GPP LTE of FIG. 5 can also apply to a resource grid for a DL slot. In this case, however, the DL slot includes a plurality of OFDM symbols in the time domain.

Figure 6:
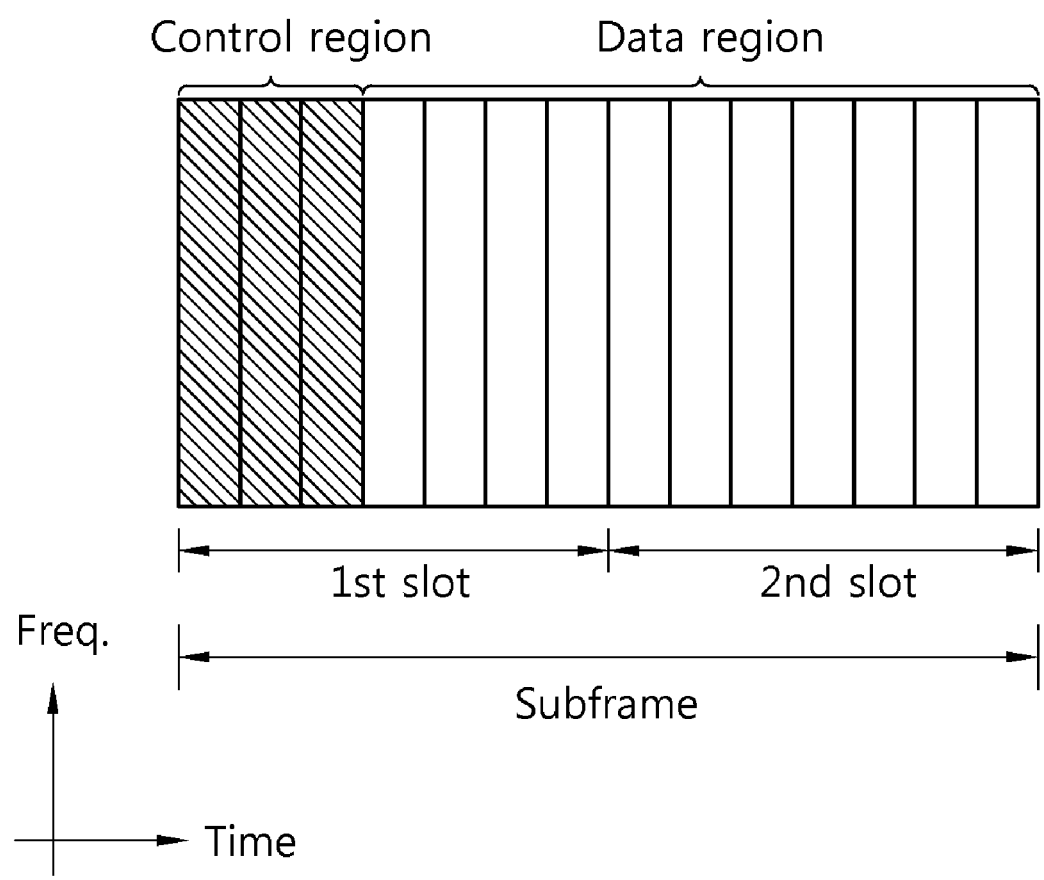
FIG. 6 shows an exemplary structure of a downlink subframe in a 3GPP LTE.

FIG. 6 shows an exemplary structure of a DL subframe in a 3GPP LTE.

Referring to FIG. 6, the DL subframe includes two consecutive slots. A maximum of three OFDM symbols located in a front portion of a $1^{st}$ slot within the DL subframe correspond to a control region to be allocated to a PDCCH. The remaining OFDM symbols correspond to a data region to be allocated to a PDSCH. In addition to the PDCCH, control channels such as a physical control format indicator channel (PCFICH), a physical hybrid ARQ indicator channel (PHICH), etc., can be allocated to the control region. The PUCCH can carry a DL grant indicating resource allocation for DL transmission on the PDSCH. A UE can read data information transmitted on the PDSCH by decoding control information transmitted on the PDCCH. Although the control region includes three OFDM symbols herein, this is for exemplary purposes only. The number of OFDM symbols included in the control region of the subframe can be known by using the PCFICH. The PHICH is a response for UL transmission, and carries an HARQ ACK/NACK signal.

The control region consists of a plurality of control channel elements (CCEs). The PDCCH is transmitted on an aggregation of one or several consecutive CCEs. The CCE corresponds to a plurality of resource element groups. The resource element group is used to define mapping of the control channel onto a resource element. If $N_{CCE}$ denotes a total number of CCEs in the DL subframe, the CCEs are indexed from 0 to $N_{CCE}-1$.

Figure 7:
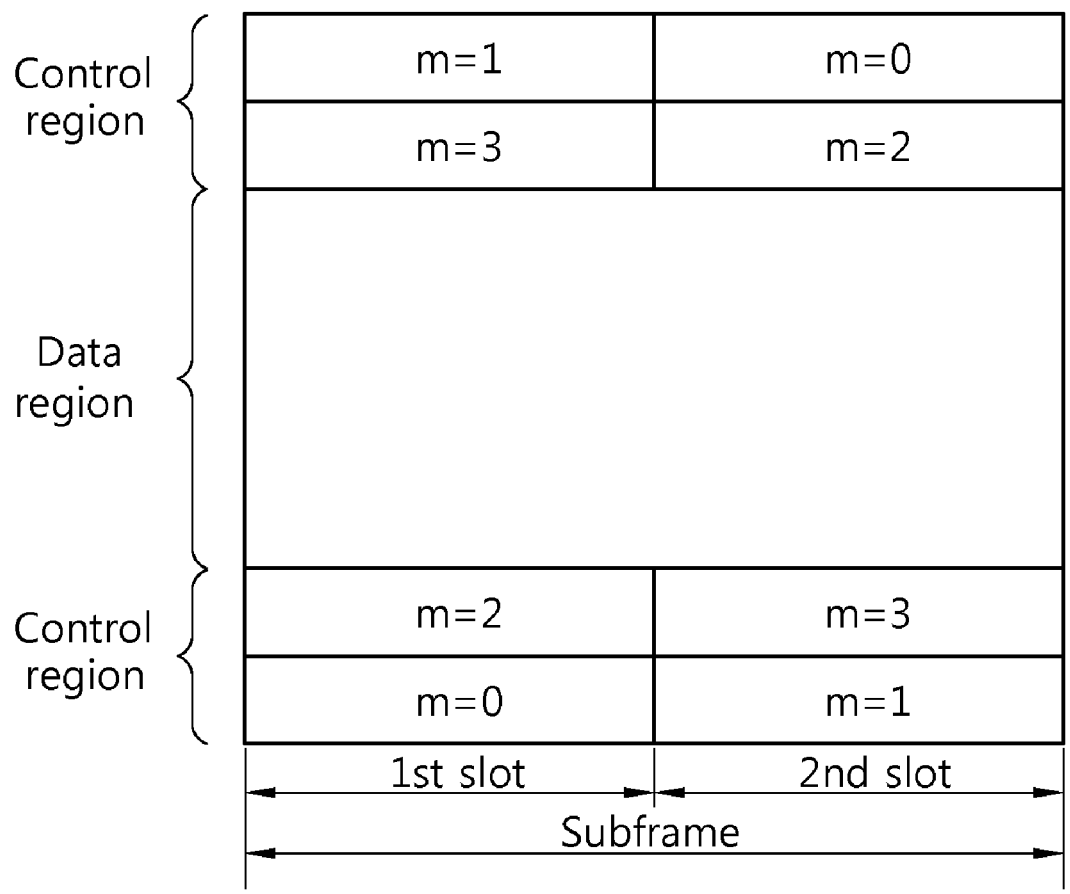
FIG. 7 shows an exemplary structure of an uplink subframe in a 3GPP LTE.

FIG. 7 shows an exemplary structure of a UL subframe in a 3GPP LTE.

Referring to FIG. 7, the UL subframe may be divided into a control region allocated to a physical uplink control channel (PUCCH) carrying a UL control signal and a data region allocated to a physical uplink shared channel (PUSCH) carrying user data. To maintain a single carrier property in SC-FDMA, consecutive RBs in a frequency domain are allocated to one UE. One UE cannot simultaneously transmit the PUCCH and the PUSCH.

The PUCCH for one UE is allocated to an RB pair in a subframe. RBs belonging to the RB pair occupy different subcarriers in each of the two slots. In this case, it is said that the RB pair allocated to the PUCCH is subject to frequency hopping at a slot boundary. In FIG. 7, m denotes a location index indicating a frequency domain location of an RB pair allocated to the PUCCH in the subframe.

The PUSCH is mapped to an uplink shared channel (UL-SCH) that is a transport channel. Examples of a UL control signal transmitted on the PUCCH include an HARQ ACK/NACK signal, a CQI indicating a DL channel condition, an SR that is a UL radio resource allocation request, etc.

The PUCCH can support multiple formats. That is, it is possible to transmit the UL control signal whose number of bits per subframe differs according to the modulation scheme. The following table shows an example of a modulation scheme and the number of bits per subframe with respect to a PUCCH format.

TABLE 1

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used to transmit the SR. A PUCCH format 1a/1b is used to transmit the HARQ ACK/NACK signal. A PUCCH format 2 is used to transmit the CQI. A PUCCH format 2a/2b is used to transmit the CQI and the HARQ ACK/NACK signal.

In any subframe, if the HARQ ACK/NACK signal is transmitted alone, the PUCCH format 1a/1b is used, and if the SR is transmitted alone, the PUCCH format 1 is used. The UE can transmit the HARQ ACK/NACK signal and the SR at the same subframe. For positive SR transmission, the UE transmits the HARQ ACK/NACK signal by using a PUCCH allocated for the SR. For negative SR transmission, the UE transmits the HARQ ACK/NACK signal by using a PUCCH resource allocated for the ACK/NACK.

A control signal transmitted on the PUCCH uses a cyclically shifted sequence. The cyclically shifted sequence can be generated by cyclically shifting a base sequence by a specific cyclic shift (CS) amount. The specific CS amount is indicated by a CS index. Various types of sequences can be used as the base sequence. For example, well-known sequences (e.g., a pseudo-random (PN) sequence and a Zadoff-Chu (ZC) sequence) can be used as the base sequence. In addition, a constant amplitude zero auto-correlation (CAZAC) sequence generated by a computer can be used as the base sequence. The following equation shows an example of the base sequence.

$$r_i(n) = e^{jb(n)\pi/4} \quad \text{[Equation 1]}$$

Herein, $i \in \{0, 1, \ldots, 29\}$ denotes a root index, and n denotes an element index satisfying $0 \leq n \leq N-1$, where N is a length of the base sequence. i can be determined by a cell identity (ID) and a slot number in a radio frame or the like. If one RB includes 12 subcarriers, N may be set to 12. A different root index defines a different base sequence. If N=12, b(n) can be defined by the following table.

TABLE 2

| i | b(0) ..., b(11) | | | | | | | | | | | |
| --- | --- | --- | --- | --- | --- | --- | --- | --- | --- | --- | --- | --- |
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |

TABLE 2-continued

| i | b(0) ..., b(11) | | | | | | | | | | | |
| --- | --- | --- | --- | --- | --- | --- | --- | --- | --- | --- | --- | --- |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A cyclically shifted sequence r(n, Ics) can be generated by cyclically shifting a base sequence r(n) according to the following equation.

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

Herein, Ics denotes a CS index indicating a CS amount ($0 \leq I_{cs} \leq N-1$, where Ics is an integer).

Hereinafter, an available CS of the base sequence is defined as a CS that can be derived from the base sequence according to a CS unit. For example, if the base sequence has a length of 12 and the CS unit is 1, the total number of available CSs of the base sequence is 12. If the base sequence has a length of 12 and the CS unit is 2, the total number of available CSs of the base sequence is 6. The CS unit can be determined by considering a delay spread.

Figure 8:
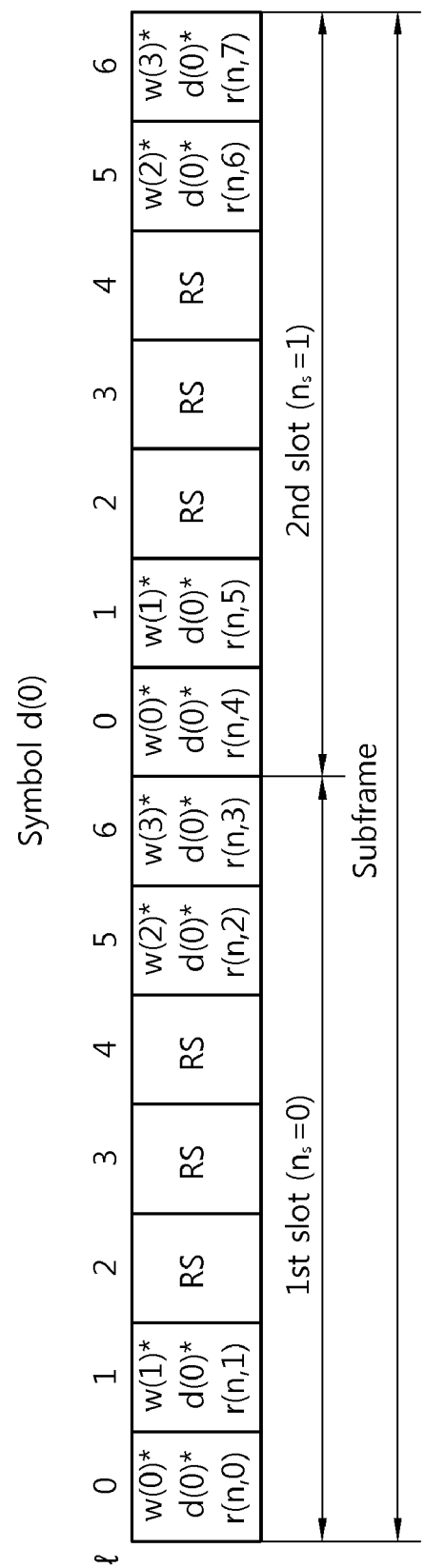
FIG. 8 shows an example of physical uplink control channel (PUCCH) format 1/1a/1b transmission when a normal cyclic prefix (CP) is used.

FIG. 8 shows an example of PUCCH format 1/1a/1b transmission when a normal CP is used. Herein, an RB pair allocated to a 1$^{st}$ slot and a 2$^{nd}$ slot in one subframe is shown.

Referring to FIG. 8, each of the 1$^{st}$ slot and the 2$^{nd}$ slot includes 7 SC-FDMA symbols. Among the 7 SC-FDMA symbols of each slot, a reference signal (RS) is carried on 3 SC-FDMA symbols, and a control signal is carried on the remaining 4 SC-FDMA symbols. The RS is carried on 3 contiguous SC-FDMA symbols positioned in a middle portion of each slot. In this case, the position and the number of symbols used for the RS may vary, and thus the position and the number of symbols used for the control signal may also vary.

Each of the PUCCH formats 1, 1a, and 1b uses one complex-valued symbol d(0). A BS can detect an SR according to presence/absence of PUCCH transmission from a UE. Therefore, a specific value (e.g., d(0)=1) can be used as the complex-valued symbol d(0) for the PUCCH format 1. The complex-valued symbol d(0) for the PUCCH format 1a is generated when 1-bit HARQ ACK/NACK information is binary phase shift keying (BPSK) modulated. The complex-valued symbol d(0) for the PUCCH format 1b is generated when 2-bit HARQ ACK/NACK information is quadrature phase shift keying (QPSK) modulated.

A modulated sequence y(n) is generated based on the complex-valued symbol d(0) for the PUCCH format 1/1a/1b and the cyclically shifted sequence r(n,Ics). The modulated sequence y(n) can be generated by multiplying the complex-valued symbol d(0) by the cyclically shifted sequence r(n,Ics) according to the following equation.

$$y(n)=d(0)r(n,I_{CS})$$ [Equation 3]

A CS index Ics of the cyclically shifted sequence r(n,Ics) may differ according to a slot number $n_s$ in a radio frame and an SC-FDMA symbol index t in a slot. Therefore, the CS index Ics can be expressed by Ics($n_s$,l). Herein, a slot number of the 1$^{st}$ slot is set to 0, a slot number of the 2$^{nd}$ slot is set to 1, and the CS index is set to Ics(0,0)=0, Ics(0,1)=1, Ics(0,5)=2, Ics(0,6)=3, Ics(1,0)=4, Ics(1,1)=5, Ics(1,5)=6, and Ics(1,6)=7. However, this is for exemplary purposes only.

To increase UE capacity, the modulated sequence y(n) can be spread by using an orthogonal sequence (OS). Herein, the modulated sequence y(n) is spread by using an OS w(k) having a spreading factor of K=4 with respect to 4 SC-FDMA symbols for carrying a control signal within one slot.

An OS $w_{Ios}(k)$ having a spreading factor of K=4 (where Ios is an OS index, $0 \leq k \leq K-1$) can use a sequence shown in the following table.

TABLE 3

| Orthogonal sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Alternatively, the OS $w_{Ios}(k)$ having a spreading factor of K=3 (where Ios is an OS index, $0 \leq k \leq K-1$) can use a sequence shown in the following table.

TABLE 4

| Orthogonal sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OS index Ios may differ according to the slot number $n_s$ in the radio frame. Therefore, the OS index Ios can be expressed by Ios($n_s$).

The modulated sequence y(n) may be scrambled in addition to being spread using the OS. For example, the modulated sequence y(n) may be multiplied by 1 or j according to a specific parameter.

The RS can be generated based on the OS and the cyclically shifted sequence generated from the same base sequence as the control signal. The cyclically shifted sequence can be used as the RS by spreading the cyclically shifted sequence with the OS w(k) having a spreading factor of K=3. Therefore, in order for the UE to transmit the control signal, in addition to the OS index and the CS index for the control signal, the OS index and the cyclically shifted index for the RS are also required.

Figure 9:
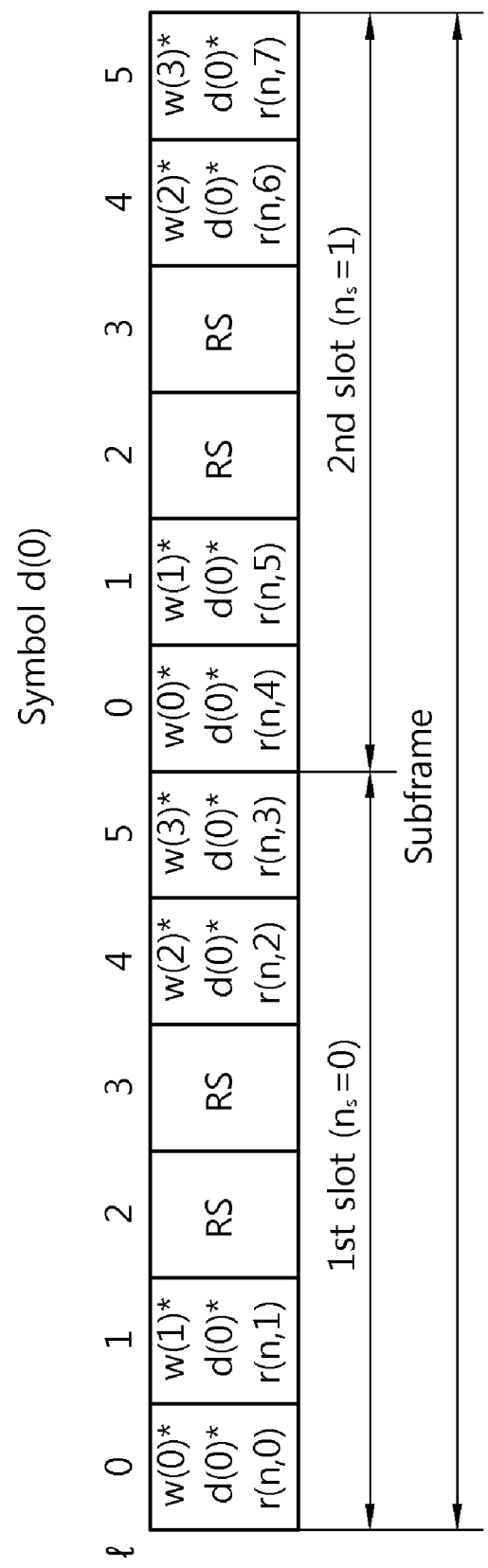
FIG. 9 shows an example of PUCCH format 1/1a/1b transmission when an extended CP is used.

FIG. 9 shows an example of PUCCH format 1/1a/1b transmission when an extended CP is used.

Referring to FIG. 9, each of a 1$^{st}$ slot and a 2$^{nd}$ slot includes 6 SC-FDMA symbols. Among the 6 SC-FDMA symbols of each slot, an RS is carried on 2 SC-FDMA symbols, and a control signal is carried on the remaining 4 SC-FDMA symbols. Other than that, the example of FIG. 8 in which the normal CP is used may be applied without alteration. However, the RS can be used by spreading the cyclically shifted sequence with the OS w(k) having a spreading factor of K=2.

An OS $w_{Ios}(k)$ having a spreading factor of K=2 (where Ios is an OS index, $0 \leq k \leq K-1$) can use a sequence shown in the following table.

TABLE 5

| Orthogonal sequence index | [w(0), w(1)] |
|---|---|
| 0 | [1 1] |
| 1 | [1 −1] |
| 2 | N/A |

As described above, for PUCCH format 1/1a/1b transmission, both of the normal CP and the extended CP require the following information. That is, a CS index Ics and an OS index Ios are required for the control signal, and a CS index I'cs and an OS index I'os are required for the RS.

Figure 10:
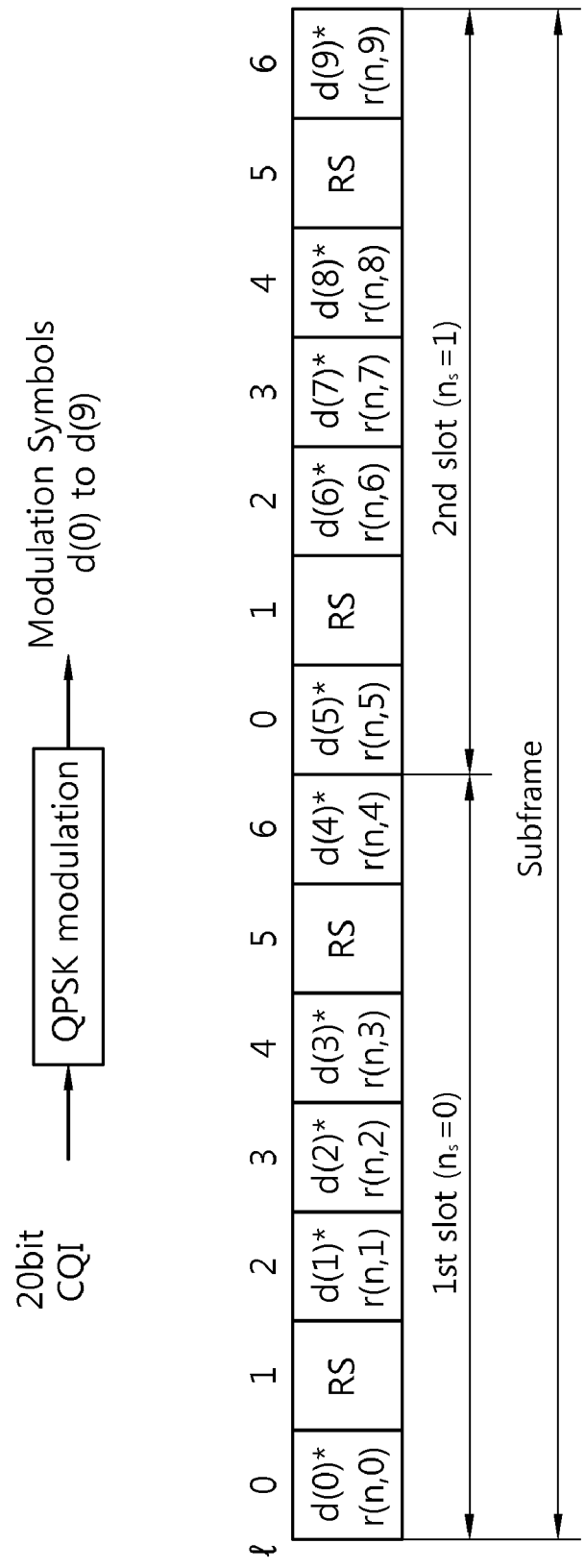
FIG. 10 shows an example of PUCCH format 2/2a/2b transmission.

FIG. 10 shows an example of PUCCH format 2/2a/2b transmission.

Referring to FIG. 10, among 7 SC-FDMA symbols included in each slot, an RS is carried on 2 SC-FDMA symbols, and a CQI is carried on the remaining 5 SC-FDMA symbols. In this case, the position and the number of symbols used for the RS may differ, and thus the position and the number of symbols used for the CQI may also differ.

Each of the PUCCH formats 2, 2a, and 2b can use 20-bit CQI information per subframe. The 20-bit CQI information is mapped to 10 complex-valued modulated symbols d(0) to d(9) by QPSK modulation. In the PUCCH format 2a, 1-bit HARQ ACK/NACK information is mapped to one complex-valued modulated symbol d(10) by BPSK modulation. In the PUCCH format 2b, 2-bit HARQ ACK/NACK information is mapped to one complex-valued modulated symbol d(10) by QPSK modulation.

A modulated sequence is generated based on the complex-valued modulated symbols d(0) to d(9) and the cyclically shifted sequence r(n,Ics) generated from the base sequence. A CS index Ics of the cyclically shifted sequence r(n,Ics) may differ according to a slot number $n_s$ in a radio frame and an SC-FDMA symbol index l in a slot. Therefore, the CS index Ics can be expressed by Ics($n_s$,l). Herein, a slot number of a 1$^{st}$ slot is set to 0, a slot number of a 2$^{nd}$ slot is set to 1, and the CS index is set to Ics(0,0)=0, Ics(0,2)=1, Ics(0,3)=2, Ics(0,4)=3, Ics(0,6)=4, Ics(1,0)=5, Ics(1,2)=6, Ics(1,3)=7, Ics(1,4)=8, and Ics(1,6)=9. However, this is for exemplary purposes only. The RS can use the cyclically shifted sequence generated from the same base sequence as the control signal. In each of the PUSCH formats 2a and 2b, one complex-valued modulated symbol d(10) is used to generate the RS.

Unlike in the PUCCH format 1/1a/1b, the PUCCH format 2/2a/2b does not use an OS.

Figure 11:
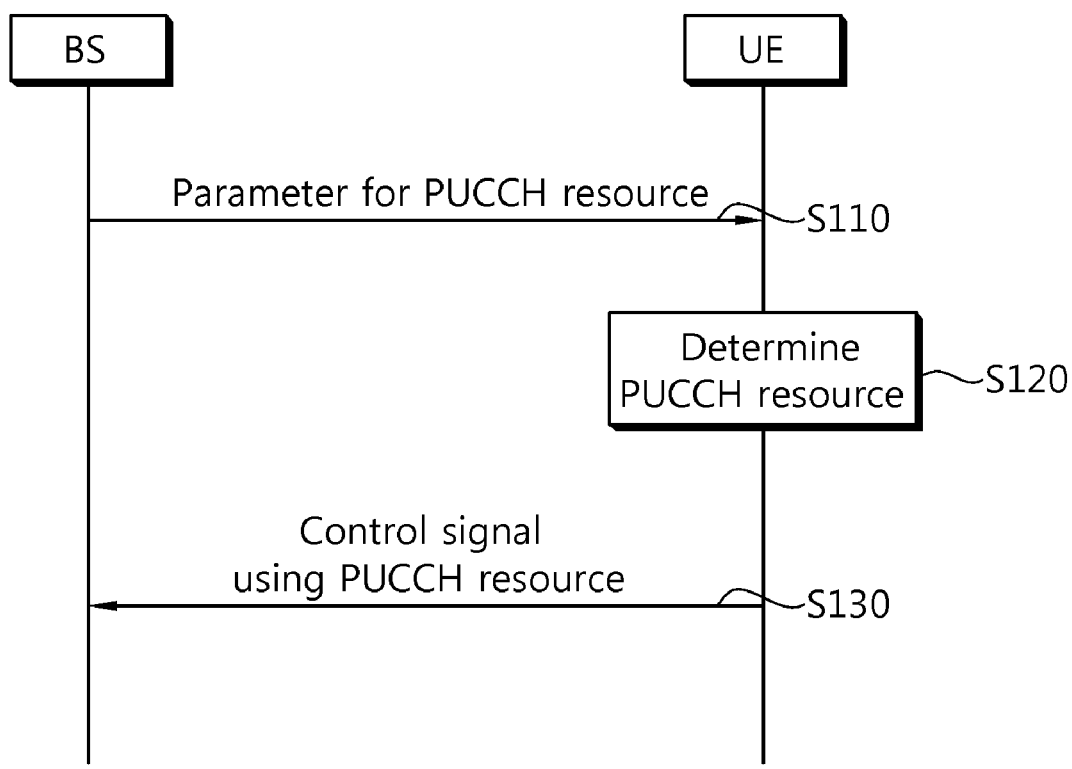
FIG. 11 is a flow diagram showing an example of a method of transmitting an uplink control signal.

FIG. 11 is a flow diagram showing an example of a method of transmitting a UL control signal.

Referring to FIG. 11, a BS transmits a parameter for a PUCCH resource to a UE (step S110). The UE determines the PUCCH resource by using the parameter for the PUCCH resource (step S120). The UE transmits a control signal by using the PUCCH resource to the BS (step S130).

A PUCCH resource is a resource used to transmit a control signal on a PUCCH. A plurality of UEs in a cell can simultaneously transmit the control signals to the BS. In this case, if the respective UEs use different PUCCH resources, the BS can distinguish the control signals of the respective UEs. The PUCCH resource is identified by a PUCCH resource index. A CS index and a frequency are determined by the PUCCH resource index. An OS index can also be determined by the PUCCH resource index. Hereinafter, $n^{(1)}_{PUCCH}$ denotes a first PUCCH resource index and is a PUCCH resource index for the PUCCH format 1/1a/1b. In addition, $n^{(2)}_{PUCCH}$ denotes a second PUCCH resource index and is a PUCCH resource index for the PUCCH format 2/2a/2b.

The parameter for the PUCCH resource can be configured by a higher layer of a physical layer. For example, the higher layer may be a radio resource control (RRC) layer that performs a function of controlling a radio resource between the UE and a network.

Examples of the parameter for the PUCCH resource include the number of RBs $N^{(2)}_{RB}$, the number of CSs $N^{(1)}_{CS}$, a CS interval $\Delta_{shift}$, and $N^{(1)}_{PUCCH}$. The parameters are common parameters which are common to all UEs in the cell. A physical resource used for the PUCCH depends on the number of RBs $N^{(2)}_{RB}$ and the number of CSs $N^{(1)}_{CS}$.

The number of RBs $N^{(2)}_{RB}$ is the number of RBs that can be available for use by only the PUCCH format 2/2a/2b transmission in each slot.

The number of CSs $N^{(1)}_{CS}$ is the number of CSs used for the PUCCH format 1/1a/1b in a mixed RB. The mixed RB is an RB used to mix the PUCCH format 1/1a/1b and the PUCCH format 2/2a/2b. At most one RB in each slot may support as the mixed RB. An RB received from the BS can be multiplexed with a UL control signal of each UE in the cell. In the mixed RB, different types of control signals can be multiplexed. For example, in the mixed RB, an HARQ ACK/NACK signal transmitted by one UE can be multiplexed with a CQI transmitted by another UE. In addition, in the mixed RB, an SR transmitted by one UE can be multiplexed with a CQI transmitted by another UE. For example, the number of CSs $N^{(1)}_{CS}$ may be set to any value in the range of 0 to 8. If the number of CSs $N^{(1)}_{CS}$ is 0, the mixed RB does not exist.

The CS interval $\Delta_{shift}$ is a minimum interval between two adjacent CSs which are reserved for PUCCHs. The CS interval may denote a difference between CS indices of first PUCCH resource indices. The first PUCCH resource indices may be consecutive or adjacent indices. Alternatively, the first PUCCH resource indices may be indices using the same OS index. The CS interval can be determined according to a channel condition.

$N^{(1)}_{PUCCH}$ denotes the number of first PUCCH resource indices allocated for an SR and a semi-persistent scheduling (SPS) ACK/NACK signal. The SPS ACK/NACK signal is an ACK/NACK signal for DL data transmitted using SPS. When the DL data is transmitted on a PDSCH, a PDCCH corresponding to the PDSCH may not exist.

The PUCCH resource indices are allocated by combining parameters for the PUCCH resource. The PUCCH resource indices can be allocated according to various rules. The UE can receive the PUCCH resource index from the BS or can acquire the PUCCH resource index according to a predetermined protocol.

The first PUCCH resource indices for the SR and the SPS ACK/NACK signal are indicated by the BS to the UE. Second PUCCH resource indices $n^{(2)}_{PUCCH}$ are also indicated by the BS to the UE. The second PUCCH resource indices $n^{(2)}_{PUCCH}$ can satisfy the following equation.

$$n^{(2)}_{PUCCH} < N^{(2)}_{RB} \cdot N + \left\lceil \frac{N^{(1)}_{CS}}{8} \right\rceil \cdot (N - N^{(1)}_{CS} - 2) \quad \text{[Equation 4]}$$

Herein, N denotes the number of subcarriers included in one RB. The reason of subtracting $N^{(1)}_{CS}$ and '2' from N is that two CS indices are unallocated to prevent interference with a CS index used by the first PUCCH resource indices in the mixed RB.

A first PUCCH resource index for a dynamic ACK/NACK signal can be obtained according to a pre-agreed protocol. The dynamic ACK/NACK signal is an ACK/NACK signal for DL data transmitted using dynamic scheduling. Dynamic scheduling implies that the BS transmits a DL grant to the UE on the PDCCH whenever the DL data is transmitted on the PDSCH. The first PUCCH resource index can be acquired from a radio resource for transmitting a control channel to receive the DL data. The following equation is an example of determining the first PUCCH resource index $n^{(1)}_{PUCCH}$.

$$n_{PUCCH}^{(1)} = n_{CCE} + N_{PUCCH}^{(1)} \quad \text{[Equation 5]}$$

Herein, $n_{CCE}$ denotes a first CCE index used for transmission of PDCCH transmission for PDSCH.

The first PUCCH resource indices are allocated by combining the number of CSs $N^{(1)}_{CS}$ and the CS interval $\Delta_{shift}$. The OS index and the CS index for the control signal are determined based on the number of CSs $N^{(1)}_{CS}$ and the CS interval $\Delta_{shift}$. The first PUCCH resource index $n^{(1)}_{PUCCH}$ can also be used to determine the CS index and the OS index. The OS index can be used to determine the CS index.

The OS index $l_{os}(n_s)$ and the CS index $l_{cs}(n_s)$ for the control signal can be obtained by the following equation.

$$l_{os}(n_s) = \begin{cases} \lfloor n'(n_s) \cdot \Delta_{shift} / N' \rfloor & \text{for normal CP} \\ 2 \cdot \lfloor n'(n_s) \cdot \Delta_{shift} / N' \rfloor & \text{for extended CP} \end{cases} \quad \text{[Equation 6]}$$

$$l_{cs}(n_s, l) = \begin{cases} [n_{cs}^{cell}(n_s, l) + (n'(n_s) \cdot \Delta_{shift} + d_{offset} + (l_{os}(n_s) \bmod \Delta_{shift})) \bmod N'] \bmod N & \text{for normal CP} \\ [n_{cs}^{cell}(n_s, l) + (n'(n_s) \cdot \Delta_{shift} + d_{offset} + l_{os}(n_s)/2) \bmod N'] \bmod N & \text{for extended CP} \end{cases}$$

$$N' = \begin{cases} N^{(1)}_{cs} & \text{if } n^{(1)}_{PUCCH} < c \cdot N^{(1)}_{cs} / \Delta_{shift} \\ N & \text{otherwise} \end{cases}$$

$$c = \begin{cases} 3 & \text{for normal } CP \\ 2 & \text{for extended } CP \end{cases}$$

$$\Delta_{shift} \in \begin{cases} \{1, 2, 3\} & \text{for normal } CP \\ \{2, 3\} & \text{for extended } CP \end{cases}$$

$$d_{offset} \in \{0, 1, \ldots, \Delta_{shift} - 1\}$$

for $n_s \bmod 2 = 0$,

-continued $$n'(n_s) = \begin{cases} n^{(1)}_{PUCCH} & \text{if } n^{(1)}_{PUCCH} < c \cdot N^{(1)}_{cs}/\Delta_{shift} \\ (n^{(1)}_{PUCCH} - c \cdot N^{(1)}_{cs}/\Delta_{shift}) \bmod (c \cdot N/\Delta_{shift}) & \text{otherwise} \end{cases}$$

for $n_s \bmod 2 = 1$, $$n'(n_s) = \begin{cases} [c(n'(n_s-1)+1)] \bmod (cN/\Delta_{shift}+1) - 1 & \text{if } n^{(1)}_{PUCCH} \geq c \cdot N^{(1)}_{cs}/\Delta_{shift} \\ \lfloor h/c \rfloor + (h \bmod c) N'/\Delta_{shift} & \text{otherwise} \end{cases}$$

$$h = (n'(n_s-1)+d) \bmod (cN'/\Delta_{shift})$$

$$d = \begin{cases} 2 & \text{for normal } CP \\ 0 & \text{for extended } CP \end{cases}$$

$$n^{cell}_{cs}(n_s, l) = \sum_{i=0}^{7} c(8N_{symb} \cdot n_s + 8l + i) \cdot 2^i$$

Herein, c(n) denotes a PN sequence, and $N_{symb}$ denotes the number of SC-FDMA symbols included in a slot. c(n) can be defined by a Gold sequence having a length of 31. The following equation shows an example of the sequence c(n).

$$c(n)=(x_1(n+N_c)+x_2(n+N_c)) \bmod 2 \quad \text{[Equation 7]}$$

$$x_1(n+31)=(x_1(n+3)+x_1(n)) \bmod 2$$

$$x_2(n+31)=(x_2(n+3)+x_2(n+2)+x_1(n+1)+x_1(n)) \bmod 2$$

Herein, $N_c$ is 1600, $x_1(i)$ denotes a $1^{st}$ m-sequence, and $x_2(i)$ denotes a $2^{nd}$ m-sequence. For example, the $1^{st}$ m-sequence can be initialized with $x_1(0)=1$, $x_1(n)=0$ ($n=1, 2, \ldots, 30$) for each radio frame. In addition, the $2^{nd}$ m-sequence can be initialized for each radio frame according to a cell ID. The $2^{nd}$ m-sequence can be initialized by the following equation.

$$c_{init} = \sum_{i=0}^{30} x_2(i) \cdot 2^i = N_{cell\_ID} \quad \text{[Equation 8]}$$

Herein, $N_{cell\_ID}$ denotes a cell ID.

The OS index $l'os(n_s)$ and the CS index $l'cs(n_s)$ for the RS can be obtained by the following equation.

Figure 12:
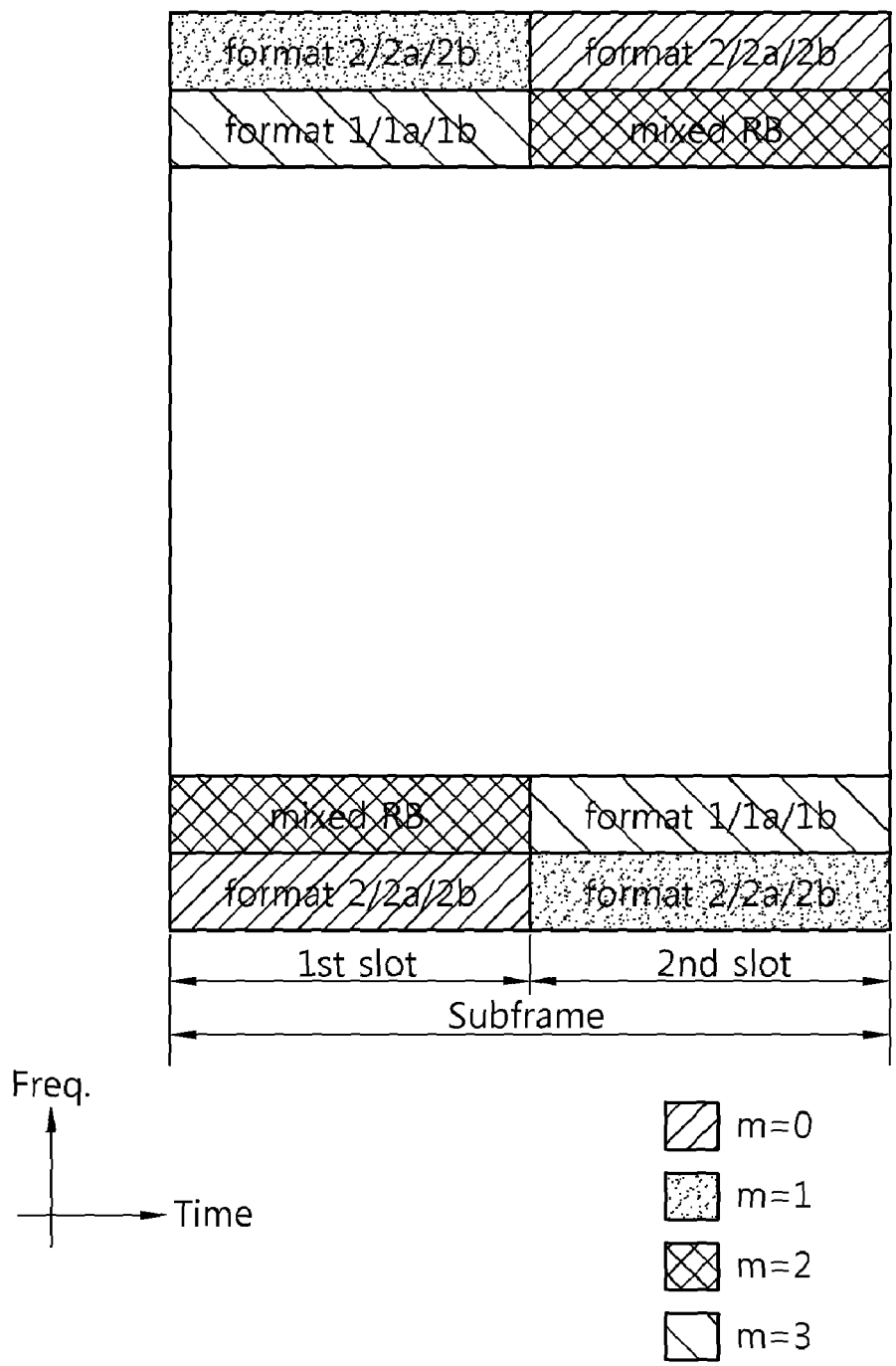
FIG. 12 shows an example of a resource block allocated to a PUCCH.

FIG. 12 shows an example of an RB allocated to a PUCCH.

Referring to FIG. 12, the number of RBs $N^{(2)}_{RB}$ is 2. Thus, two RBs (e.g., m=0, 1) are used for transmission of only PUCCH format 2/2a/2b. If m=2, an RB is a mixed RB. If m=3, an RB is used for transmission of only PUCCH format 1/1a/1b.

An RB (or a subcarrier) allocated to the PUCCH can be obtained from a PUCCH resource index. A location index m indicates a frequency domain location of an RB pair allocated to the PUCCH in a subframe and can be obtained by the following equation.

for formats 1, 1a and 1b [Equation 10]

$$m = \begin{cases} N^{(2)}_{RB} & \text{if } n^{(1)}_{PUCCH} - c \cdot N^{(1)}_{cs}/\Delta_{shift} \\ \left\lfloor \dfrac{n^{(1)}_{PUCCH} - c \cdot N^{(1)}_{cs}/\Delta_{shift}}{c \cdot N/\Delta_{shift}} \right\rfloor + N^{(2)}_{RB} + \left\lceil \dfrac{N^{(1)}_{cs}}{8} \right\rceil & \text{otherwise} \end{cases}$$

for formats 2, 2a, and 2b $$m = \lfloor n^{(2)}_{PUCCH}/N \rfloor$$

Hereinafter, when the first PUCCH resource indices $n^{(1)}_{PUCCH}$ are allocated by combining parameters for PUCCH resources, an exemplary problematic combination of parameters will be described.

(1) First Exemplary Combination

The first exemplary combination is a case where a CS interval is 3 (i.e., $\Delta_{shift}=3$) in an RB supporting only the PUCCH format 1/1a/1b when the expended CP is used.

The following table shows allocation of the first PUCCH resource indices $n^{(1)}_{PUCCH}$ according to the first exemplary combination.

$$l'_{os}(n_s) = \begin{cases} \lfloor n'(n_s) \cdot \Delta_{shift}/N' \rfloor & \text{for normal } CP \\ 2 \cdot \lfloor n'(n_s) \cdot \Delta_{shift}/N' \rfloor & \text{for extended } CP \end{cases} \quad \text{[Equation 9]}$$

$$l'_{cs}(n_s) = \begin{cases} [n^{cell}_{cs}(n_s, l) + (n'(n_s) \cdot \Delta_{shift} + d_{offset} + (l'_{os}(n_s) \bmod \Delta_{shift})) \bmod N'] \bmod N & \text{for normal } CP \\ [n^{cell}_{cs}(n_s, l) + (n'(n_s) \cdot \Delta_{shift} + d_{offset} + l'_{os}(n_s)/2) \bmod N'] \bmod N & \text{for extended } CP \end{cases}$$

TABLE 6

| $d_{offset} = 2$ Ics | $d_{offset} = 1$ Ics | $d_{offset} = 0$ Ics | I'os = 0 | I'os = 2 | Ios = 0 | Ios = 2 |
|---|---|---|---|---|---|---|
| 2 | 1 | 0 |  | M + 7 |  | M + 7 |
| 3 | 2 | 1 |  |  |  |  |
| 4 | 3 | 2 | M + 0 |  | M + 0 |  |
| 5 | 4 | 3 |  | M + 4 |  | M + 4 |
| 6 | 5 | 4 |  |  |  |  |
| 7 | 6 | 5 | M + 1 |  | M + 1 |  |
| 8 | 7 | 6 |  | M + 5 |  | M + 5 |
| 9 | 8 | 7 |  |  |  |  |
| 10 | 9 | 8 | M + 2 |  | M + 2 |  |
| 11 | 10 | 9 |  | M + 6 |  | M + 6 |
| 0 | 11 | 10 |  |  |  |  |
| 1 | 0 | 11 | M + 3 |  | M + 3 |  |

Herein, 8 first PUCCH resource indices $n^{(1)}_{PUCCH}$ allocated in the RB are indexed from M+0 to M+7. For example, if the first PUCCH resource index is M+7, the CS index Ics for the control signal and the RS is 0 (where $d_{offset}=0$), and the OS indices Ios and I'os for the control signal and the RS are 2. M denotes the number of first PUCCH resource indices $n^{(1)}_{PUCCH}$ allocated in a previous RB of the RB. The previous RB may be an RB whose location index is smaller than that of the RB in the same slot. For example, the previous RB may be a mixed RB. If the number of CSs $N^{(1)}_{CS}$ is 0, the mixed RB does not exist, and thus M may be 0. If M=0, it implies that the first PUCCH resource indices $n^{(1)}_{PUCCH}$ are initially allocated in the RB.

There is a problem in that the first PUCCH resource index M+7 does not follow an index order. For consistency, the location of the index M+7 may be modified in accordance with the index order. However, it is difficult to correctly modify the index M+7. This is because the first PUCCH resource indices are allocated in an RB subsequent to the mixed RB. The index M+7 may be used without modification since performance is not significantly affected.

(2) Second Exemplary Combination

The second exemplary combination is a case where a CS shift interval $\Delta_{shift}$ is 3 and the number of CSs $N^{(1)}_{CS}$ is 8 in a mixed RB when the normal CP is used.

The following table shows allocation of the first PUCCH resource indices $n^{(1)}_{PUCCH}$ according to the second exemplary combination.

TABLE 7

| $d_{offset} = 2$ Ics | $d_{offset} = 1$ Ics | $d_{offset} = 0$ Ics | I'os = 0 | I'os = 1 | I'os = 2 | Ios = 0 | Ios = 1 | Ios = 2 |
|---|---|---|---|---|---|---|---|---|
| 2 | 1 | 0 | 0 |  | 5 | 0 |  | 5 |
| 3 | 2 | 1 |  |  |  |  |  |  |
| 4 | 3 | 2 |  | 3 |  |  | 3 |  |
| 5 | 4 | 3 | 1 |  |  | 1 |  |  |
| 6 | 5 | 4 |  |  | 6 |  |  | 6 |
| 7 | 6 | 5 |  | 4 |  |  | 4 |  |
| 8 | 7 | 6 | 2 |  |  | 2 |  |  |
| 9 | 8 | 7 |  |  | 7 |  |  | 7 |
| 10 | 9 | 8 |  | N/A |  |  | N/A |  |
| 11 | 10 | 9 |  | $I_{CQI}$ |  |  | $I_{CQI}$ |  |
| 0 | 11 | 10 |  | $I_{CQI}$ |  |  | $I_{CQI}$ |  |
| 1 | 0 | 11 |  | N/A |  |  | N/A |  |

Herein, 8 first PUCCH resource indices $n^{(1)}_{PUCCH}$ allocated in the mixed RB are indexed from 0 to 7. N/A denotes an unallocated CS index. The unallocated CS index is a CS index which is not allocated to any UE in a cell. In the table above, $I_{CQI}$ denotes the second PUCCH resource indices $n^{(2)}_{PUCCH}$ allocated for CQI transmission. In the mixed RB, two second PUCCH resource indices are allocated.

The first PUCCH resource index 5 does not follow an index order. The first PUCCH resource indices 0 and 5 use the same CS index, and arrangement of the first PUCCH resource indices 6 and 7 is also problematic. Therefore, the first PUCCH resource indices 3, 4, 5, 6, and 7 have a problem in index allocation. If the first PUCCH resource indices have an irregular pattern as in the second exemplary combination, an interference amount may increase. This may result in performance deterioration of a wireless communication system.

The system performance can be improved as shown in the following table by modifying allocation of the first PUCCH resource indices $n^{(1)}_{PUCCH}$ according to the second exemplary combination.

TABLE 8

| $d_{offset} = 2$ Ics | $d_{offset} = 1$ Ics | $d_{offset} = 0$ Ics | I'os = 0 | I'os = 1 | I'os = 2 | Ios = 0 | Ios = 1 | Ios = 2 |
|---|---|---|---|---|---|---|---|---|
| 2 | 1 | 0 | 0 |  |  | 0 |  |  |
| 3 | 2 | 1 |  | 3 |  |  | 3 |  |
| 4 | 3 | 2 |  |  | 6 |  |  | 6 |
| 5 | 4 | 3 | 1 |  |  | 1 |  |  |

TABLE 8-continued

| $d_{offset} = 2$ Ics | $d_{offset} = 1$ Ics | $d_{offset} = 0$ Ics | I'os = 0 | I'os = 1 | I'os = 2 | Ios = 0 | Ios = 1 | Ios = 2 |
|---|---|---|---|---|---|---|---|---|
| 6 | 5 | 4 | | 4 | | | 4 | |
| 7 | 6 | 5 | | | 7 | | | 7 |
| 8 | 7 | 6 | 2 | | | 2 | | |
| 9 | 8 | 7 | | 5 | | | 5 | |
| 10 | 9 | 8 | | N/A | | | N/A | |
| 11 | 10 | 9 | | $I_{CQI}$ | | | $I_{CQI}$ | |
| 0 | 11 | 10 | | $I_{CQI}$ | | | $I_{CQI}$ | |
| 1 | 0 | 11 | | N/A | | | N/A | |

(3) Third Exemplary Combination

The third exemplary combination is a case where a CS shift interval $\Delta_{shift}$ is 3 and the number of CSs $N^{(1)}_{CS}$ is 8 in a mixed RB when the extended CP is used.

The following table shows allocation of the first PUCCH resource indices $n^{(1)}_{PUCCH}$ according to the third exemplary combination.

TABLE 9

| $d_{offset} = 2$ Ics | $d_{offset} = 1$ Ics | $d_{offset} = 0$ Ics | I'os = 0 | I'os = 2 | Ios = 0 | Ios = 2 |
|---|---|---|---|---|---|---|
| 2 | 1 | 0 | 0 | 5 | 0 | 5 |
| 3 | 2 | 1 | | | | |
| 4 | 3 | 2 | | 3 | | 3 |
| 5 | 4 | 3 | 1 | | 1 | |
| 6 | 5 | 4 | | | | |
| 7 | 6 | 5 | | 4 | | 4 |
| 8 | 7 | 6 | 2 | | 2 | |
| 9 | 8 | 7 | | | | |
| 10 | 9 | 8 | | N/A | | N/A |
| 11 | 10 | 9 | | $I_{CQI}$ | | $I_{CQI}$ |
| 0 | 11 | 10 | | $I_{CQI}$ | | $I_{CQI}$ |
| 1 | 0 | 11 | | N/A | | N/A |

Herein, 6 first PUCCH resource indices $n^{(1)}_{PUCCH}$ allocated in the mixed RB are indexed from 0 to 5. In the mixed RB, two second PUCCH resource indices $n^{(2)}_{PUCCH}$ are allocated.

The first PUCCH resource index 5 does not follow an index order, and the first PUCCH resource indices 0 and 5 use the same CS index. Therefore, the first PUCCH resource indices 3, 4, and 5 have a problem in index allocation.

The system performance can be improved as shown in the following table by modifying allocation of the first PUCCH resource indices $n^{(1)}_{PUCCH}$ according to the third exemplary combination.

TABLE 10

| $d_{offset}=2$ Ics | $d_{offset}=1$ Ics | $d_{offset}=0$ Ics | I'os = 0 | I'os = 2 | Ios = 0 | Ios = 2 |
|---|---|---|---|---|---|---|
| 2 | 1 | 0 | 0 | | 0 | |
| 3 | 2 | 1 | | 3 | | 3 |
| 4 | 3 | 2 | | | | |
| 5 | 4 | 3 | 1 | | 1 | |
| 6 | 5 | 4 | | 4 | | 4 |
| 7 | 6 | 5 | | | | |
| 8 | 7 | 6 | 2 | | 2 | |
| 9 | 8 | 7 | | 5 | | 5 |
| 10 | 9 | 8 | | N/A | | N/A |
| 11 | 10 | 9 | | $I_{CQI}$ | | $I_{CQI}$ |
| 0 | 11 | 10 | | $I_{CQI}$ | | $I_{CQI}$ |
| 1 | 0 | 11 | | N/A | | N/A |

If allocation of the first PUCCH resource indices is modified in the problematic combination of parameters, this is an exceptional case of the aforementioned PUCCH resource index allocation rule. Modification of exceptional allocation rule results in increased complexity of the wireless communication system and additional costs. The aforementioned problematic combination of parameters is for exemplary purposes only, and thus there may be more cases of the problematic combination of parameters. Therefore, the modification of the exceptional allocation rule is not a desired solution.

A PUCCH resource index allocation rule itself may be modified and formulated so that there is no case of the problematic combination of parameters. However, even if a new PUCCH resource index allocation rule can be successfully formulated and implemented, performance improvement is almost ineffective or negligibly effective when considering efforts and expenses invested. Accordingly, there is a need for a method capable of solving this problem simply.

If there is a restriction on the use of the problematic combination of parameters or if a combination of available parameters is configured, a problem which may occur in the allocation of the first PUCCH resource indices can be simply solved. For example, the number of available CSs $N^{(1)}_{CS}$ can be limited. Accordingly, the first PUCCH resource indices can be allocated without any problem in both the normal CP and the extended CP. Hereinafter, a method of configuring a combination of available parameters will be described case by case.

In a first case, a CS interval is 3 ($\Delta_{shift}=3$) in a mixed RB when the normal CP is used. If the number of CSs $N^{(1)}_{CS}$ is 2, 4, 5, 7, or 8, a problem arises when the first PUCCH resource indices are allocated. Thus, if $\Delta_{shift}=3$ when the normal CP is used, $N^{(1)}_{CS}$ must not be set to 2, 4, 5, 7, or 8. That is, $N^{(1)}_{CS}$ may be set to 0, 1, 3, or 6.

In a second case, a CS interval is 3 ($\Delta_{shift}=3$) in a mixed RB when the extended CP is used. Similarly to the normal CP, if the number of CSs $N^{(1)}_{CS}$ is 2, 4, 5, 7, or 8, a problem arises when the first PUCCH resource indices are allocated. Thus, if $\Delta_{shift}=3$ when the extended CP is used, $N^{(1)}_{CS}$ may be set to 0, 1, 3, or 6 similarly to the normal CP.

Accordingly, irrespective of a CP type, if $\Delta_{shift}=3$, $N^{(1)}_{CS}$ may be set to 0, 1, 3, or 6. If $N^{(1)}_{CS}$ is 0, the mixed RB does not exist, and thus $N^{(1)}_{CS}$ may be set to 0. If $N^{(1)}_{CS}$ is 1, only one first PUCCH resource index exists, and thus $N^{(1)}_{CS}$ may be set to 1.

In this case, a set of available parameters can be configured variously. For simple implementation, if $\Delta_{shift}=3$, a set of numbers of available CSs $N^{(1)}_{CS}$ can be configured into {3}, {6}, {0, 3}, {0, 6}, or {0, 3, 6}.

The number of CSs $N^{(1)}_{CS}$ can be set to a multiple of the CS interval $\Delta_{shift}$. This can be expressed by the following equation.

$$N^{(1)}_{CS} = k \times \Delta_{shift} \quad \text{[Equation 11]}$$

Herein, k is an integer. A set of possible k can be configured into {1}, {2}, {0, 1}, {0, 2}, {1, 2}, or {0, 1, 2}. Accordingly, the set of possible numbers of available CSs $N^{(1)}_{CS}$ can be configured variously.

According to the number of CSs $N^{(1)}_{CS}$, a CS index used by the second PUCCH resource index $n^{(2)}_{PUCCH}$ in a mixed RB and the number $N_{CQI}$ of second PUCCH resource indices $n^{(2)}_{PUCCH}$ allocated in the mixed RB are determined. If $\Delta_{shift}=3$ and if a difference between CS indices of consecutive second PUCCH resource indices allocated in the mixed RB is 1, the number of CSs $N^{(1)}_{CS}$ and the number $N_{CQI}$ of second PUCCH resource indices can be related as shown in the following table.

TABLE 11

| $\Delta_{shift}$ | $N^{(1)}_{CS}$ | $N_{CQI}$ |
|---|---|---|
| 3 | 8 | 2 |
| 3 | 7 | 3 |
| 3 | 6 | 4 |
| 3 | 5 | 5 |
| 3 | 4 | 6 |
| 3 | 3 | 7 |
| 3 | 2 | 8 |
| 3 | 1 | 9 |
| 3 | 0 | 12 |

The number $N_{CQI}$ of second PUCCH resource indices $n^{(2)}_{PUCCH}$ allocated in the mixed RB can be set in association with the CS interval $\Delta_{shift}$ and the number of CSs $N^{(1)}_{CS}$. That is, a difference between CS indices of consecutive second PUCCH resource indices allocated in the mixed RB can be set to a value identical to $\Delta_{shift}$. In this case, the number of CSs $N^{(1)}_{CS}$ and the number $N_{CQI}$ of the second PUCCH resource indices can be related as shown in the following table.

TABLE 12

| $\Delta_{shift}$ | $N^{(1)}_{CS}$ | $N_{CQI}$ |
|---|---|---|
| 3 | 8 | 1 |
| 3 | 7 | 1 |
| 3 | 6 | 1 |
| 3 | 5 | 1 |
| 3 | 4 | 2 |
| 3 | 3 | 2 |
| 3 | 2 | 2 |
| 3 | 1 | 3 |
| 3 | 0 | 4 |

However, according to the CS interval $\Delta_{shift}=3$, the number of available CSs $N^{(1)}_{CS}$ is limited to 0, 1, 3 and 6.

In this case, the set of available parameters which are the CS interval $\Delta_{shift}$, the number of CSs $N^{(1)}_{CS}$, and $N_{CQI}$ can be configured by the following table.

TABLE 13

| $\Delta_{shift}$ | $N^{(1)}_{CS}$ | $N_{CQI}$ |
|---|---|---|
| 3 | 6 | 1 |
| 3 | 3 | 2 |
| 3 | 1 | 3 |
| 3 | 0 | 4 |

Since the set of available parameters can be simply configured as shown in the above table, implementation is simple and thus a system overhead can be reduced.

Figure 13:
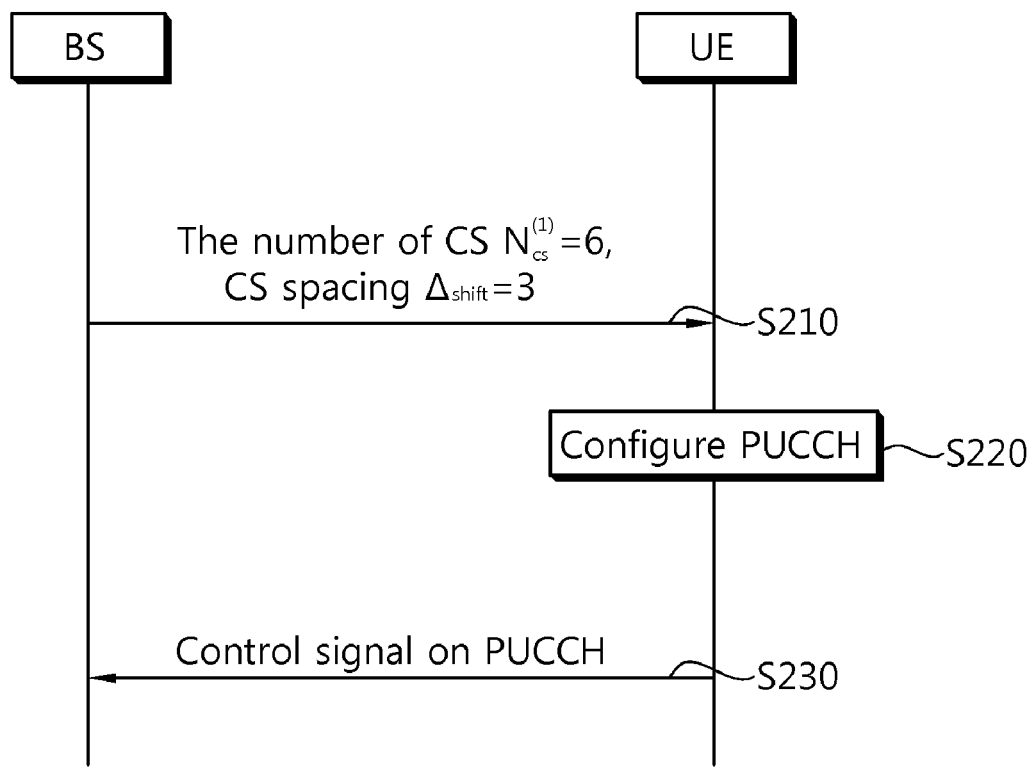
FIG. 13 is a flow diagram showing a method of transmitting a control signal according to an embodiment of the present invention.

FIG. 13 is a flow diagram showing a method of transmitting a control signal according to an embodiment of the present invention.

Referring to FIG. 13, a BS transmits the number of CSs $N^{(1)}_{CS}$ and a CS interval $\Delta_{shift}$ to a UE (step S210). In this step, $N^{(1)}_{CS}=6$, and $\Delta_{shift}=3$. That is, $N^{(1)}_{CS}$ is an integer multiple of $\Delta_{shift}$. The UE configures a PUCCH (step S220). In this step, the UE configures the PUCCH by using the number of CSs $N^{(1)}_{CS}$ and the CS interval $\Delta_{shift}$. The UE transmits a control signal on the PUCCH to the BS (step S230). The control signal may be an HARQ ACK/NACK signal, an SR, etc.

Figure 14:
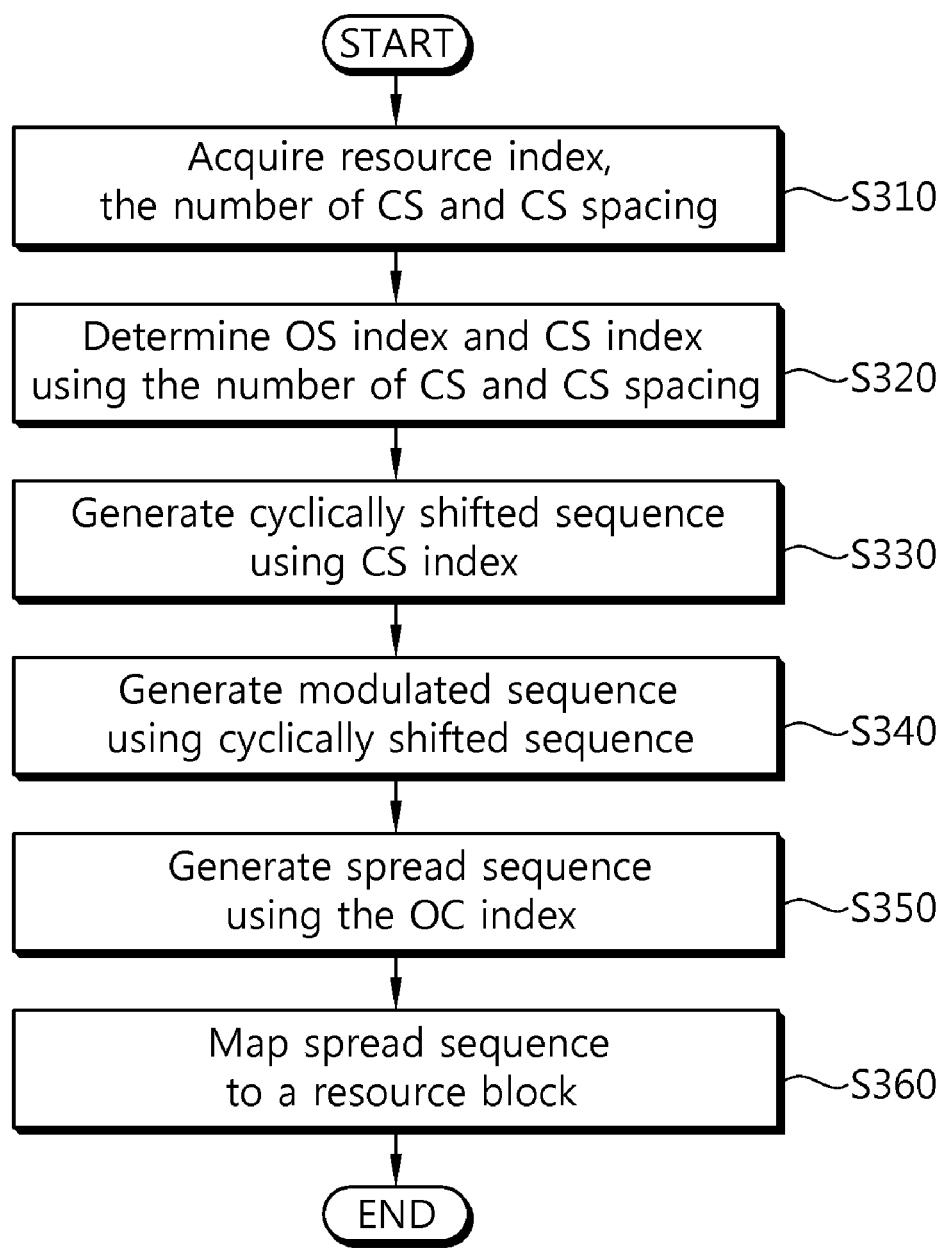
FIG. 14 is an exemplary flowchart showing a method of configuring a PUCCH.

FIG. 14 is an exemplary flowchart showing a method of configuring a PUCCH.

Referring to FIG. 14, a UE acquires a resource index, the number of CSs, and a CS interval (step S310). The resource index may be the first PUCCH resource index $n^{(1)}_{PUCCH}$. The UE determines an OS index and a CS index by respectively using the number of CSs and the CS interval (step S320). The UE generates a cyclically shifted sequence by using the CS index (step S330). The cyclically shifted sequence is generated by cyclically shifting a base sequence by a CS amount indicated by the CS index. The UE generates a modulated sequence by using the cyclically shifted sequence and a symbol for a control signal (step S340). The modulated sequence can be generated by multiplying the cyclically shifted sequence by the symbol. The UE generates a spread sequence by using the OS index (step S350). The spread sequence is generated by spreading the modulated sequence with an OS indicated by the OS index. The UE maps the spread sequence to an RB (step S360). The RB is an RB indicated by the resource index. The UE transmits the spread sequence mapped to the RB. The RB may be a mixed RB or may be an RB used for transmission of only the PUCCH format 1/1a/1b.

Figure 15:
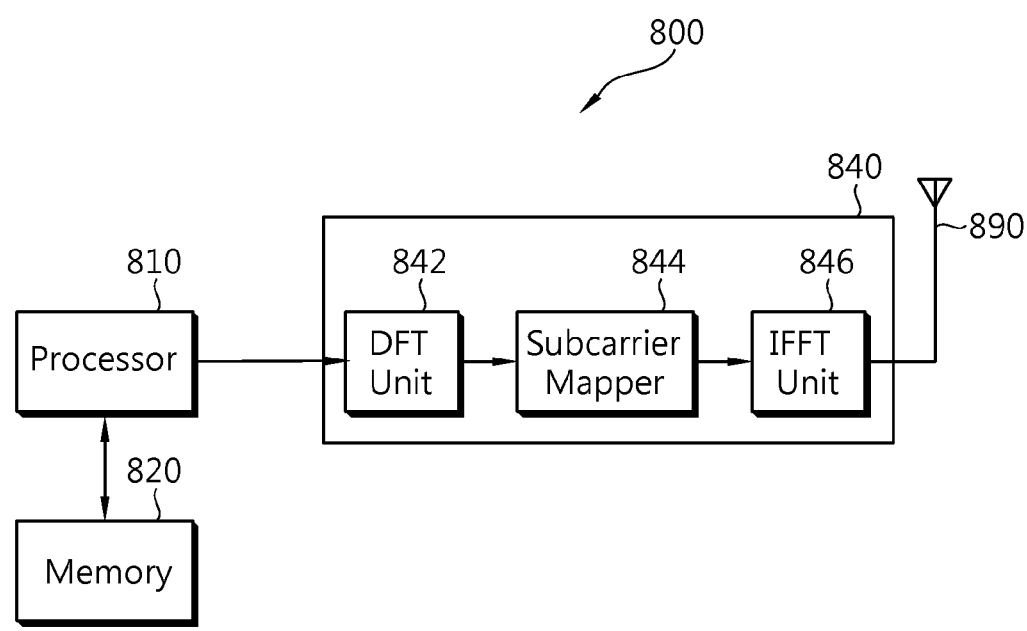
FIG. 15 is a block diagram showing an apparatus for a wireless communication according to an embodiment of the present invention.

FIG. 15 is a block diagram showing an apparatus for a wireless communication according to an embodiment of the present invention. The apparatus may be a part of a UE.

Referring to FIG. 15, the apparatus 800 for a wireless communication includes a processor 810, a memory 820, and a signal generator 840. The memory 820 stores a base sequence. The processor 810 is coupled with the memory 820 and the signal generator 840. and the processor 810 configures a control channel. The processor 810 configures a PUCCH for transmitting a control signal by processing the control signal according to the aforementioned method. The signal generator 840 generates a radio signal to be transmitted through an antenna 890 by using the control signal processed by the processor 810.

The signal generator 840 can generate the transmission signal by using an SC-FDMA scheme. For this, the signal generator 840 can include a discrete Fourier transform (DFT) unit 842 for performing DFT, a subcarrier mapper 844, and an inverse fast Fourier transform (IFFT) unit 846 for performing IFFT. The DFT unit 842 performs DFT on an input sequence and thus outputs frequency-domain symbols. The subcarrier mapper 844 maps the frequency-domain symbols to each subcarrier. The IFFT unit 846 performs IFFT on an input symbol and thus outputs time-domain signals. The time-domain signals are transmission signals, and are transmitted through the antenna 890. The time-domain signals generated by the signal generator 840 may be generated using the SC-FDMA scheme. In this case, the time-domain signals output from the signal generator 840 are referred to as SC-FDMA symbols or OFDMA symbols.

As such, incorrect allocation of a PUCCH resource index can be prevented by limiting the number of available CSs according to a CS interval. This method has an advantage in that implementation is significantly simple. Accordingly, interference that may occur between UEs can be reduced, and system performance deterioration can be avoided. Therefore, overall system performance can be improved.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting an acknowledgment (ACK)/non-acknowledgment (NACK) signal at a user equipment (UE) in a wireless communication system, the method comprising:

receiving from a base station (BS) information regarding $N_{cs}^{(1)}$, $N_{RB}^{(2)}$ and $\Delta_{shift}^{PUCCH}$, $N_{cs}^{(1)}$ indicating a number of cyclic shift indexes (CSIs) used for (2 transmission of the ACK/NACK signal in a mixed resource block, $N_{RB}^{(2)}$ indicating a number of resource blocks available for transmission of a channel quality indicator (CQI), and $\Delta_{shift}^{PUCCH}$ indicating a cyclic shift (CS) interval;

determining a first resource index $n_{PUCCH}^{(1)}$ that identifies resources used for transmission of the ACK/NACK signal;

determining a second resource index $n_{PUCCH}^{(2)}$ that identifies resources used for transmission of the CQI;

determining an orthogonal sequence index (OSI) and a CSI to be used for transmitting the ACK/NACK signal based on $N_{cs}^{(1)}$, $\Delta_{shift}^{PUCCH}$ and $n_{PUCCH}^{(1)}$; and transmitting the ACK/NACK signal to the BS using the determined OSI and CSI, wherein $N_{cs}^{(1)}$ is an integer multiple of $\Delta_{shift}^{PUCCH}$, wherein the ACK/NACK signal and the CQI are transmitted in the mixed resource block by one or more UEs, and wherein $n_{PUCCH}^{(2)}$ is determined such that $$n_{PUCCH}^{(2)} < N_{RB}^{(2)} N = \left\lceil \frac{N_{cs}^{(1)}}{8} \right\rceil \cdot (N - N_{cs}^{(1)} - 2),$$

N denoting a number of subcarriers included in one resource block.

2. The method of claim 1, wherein transmitting the ACK/NACK signal comprises:

generating a modulated sequence by modulating the ACK/NACK signal with a sequence, wherein the sequence is cyclically shifted with the determined CSI;

generating spread symbols by spreading the modulated sequence with an orthogonal sequence (OS) obtained from the determined OSI; and transmitting the spread symbols via a physical uplink control channel (PUCCH).

3. The method of claim 1, wherein the CS interval is a minimum interval between two adjacent CSIs corresponding to an ACK/NACK signal transmission.

4. The method of claim 1, wherein the mixed resource block comprises a plurality of subcarriers and a plurality of single carrier-frequency division multiple access (SC-FDMA) symbols.

5. A user equipment (UE) for transmitting an acknowledgment (ACK)/non-acknowledgment (NACK) signal in a wireless communication system, the UE comprising:

a signal generator configured to generate and transmit a radio signal; and a processor coupled to the signal generator and configured to:

receive from a base station (BS) information regarding $N_{cs}^{(1)}$, $N_{RB}^{(2)}$ and $\Delta_{shift}^{PUCCH}$, $N_{cs}^{(1)}$ indicating a number of cyclic shift indexes (CSIs) used for transmission of the ACK/NACK signal in a mixed resource block, $N_{RB}^{(2)}$ indicating a number of resource blocks available for transmission of a channel quality indicator (CQI), and $\Delta_{shift}^{PUCCH}$ indicating a cyclic shift (CS) interval;

determine a first resource index $n_{PUCCH}^{(1)}$ that identifies resources used for transmission of the ACK/NACK signal;

determine a second resource index $n_{PUCCH}^{(2)}$ that identifies resources used for transmission of the CQI;

determine an orthogonal sequence index (OSI) and a CSI to be used for transmitting the ACK/NACK signal based on $N_{cs}^{(1)}$, $\Delta_{shift}^{PUCCH}$ and $n_{PUCCH}^{(1)}$; and transmit the ACK/NACK signal to the BS using the determined OSI and CSI, wherein $N_{cs}^{(1)}$ is an integer multiple of $\Delta_{shift}^{PUCCH}$, wherein the ACK/NACK signal and the CQI are transmitted in the mixed resource block by one or more UEs, and wherein $n_{PUCCH}^{(2)}$ is determined such that $$n_{PUCCH}^{(2)} < N_{RB}^{(2)} N = \left\lceil \frac{N_{cs}^{(1)}}{8} \right\rceil \cdot (N - N_{cs}^{(1)} - 2),$$

N denoting a number of subcarriers included in one resource block.

6. The UE of claim 5, wherein the processor is further configured to transmit the ACK/NACK signal by:

generating a modulated sequence by modulating the ACK/NACK signal with a sequence, wherein the sequence is cyclically shifted with the determined CSI;

generating spread symbols by spreading the modulated sequence with an orthogonal sequence (OS) obtained from the determined OSI; and transmitting the spread symbols via a physical uplink control channel (PUCCH).

7. The UE of claim 5, wherein the CS interval is a minimum interval between two adjacent CSIs corresponding to an ACK/NACK signal transmission.

8. The UE of claim 5, wherein the mixed resource block comprises a plurality of subcarriers and a plurality of single carrier-frequency division multiple access (SC-FDMA) symbols.

* * * * *

UNITED STATES PATENT AND TRADEMARK OFFICE
CERTIFICATE OF CORRECTION

PATENT NO.         : 8,259,602 B2                            Page 1 of 1
APPLICATION NO.    : 12/427555
DATED              : September 4, 2012
INVENTOR(S)        : Hak Seong Kim et al.

It is certified that error appears in the above-identified patent and that said Letters Patent is hereby corrected as shown below:

In the Claims

Column 21, Claim 1, Line 28, delete "used for (2" and insert --used for--.

Signed and Sealed this
Twenty-second Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,259,602 B2
APPLICATION NO. : 12/427555
DATED : September 4, 2012
INVENTOR(S) : Hak Seong Kim et al.

It is certified that error appears in the above-identified patent and that said Letters Patent is hereby corrected as shown below:

In the Claims

Claim 1 at Line 50 of Column 21, please delete "$n^{(2)}_{PUCCH} < N^{(2)}_{RB} N = \left\lceil \frac{N^{(1)}_{cs}}{8} \right\rceil \cdot (N - N^{(1)}_{cs} - 2),$" and insert -- $n^{(2)}_{PUCCH} < N^{(2)}_{RB} N + \left\lceil \frac{N^{(1)}_{cs}}{8} \right\rceil \cdot (N - N^{(1)}_{cs} - 2)$ --.

Claim 5 at Line 40 of Column 22, please delete "$n^{(2)}_{PUCCH} < N^{(2)}_{RB} N = \left\lceil \frac{N^{(1)}_{cs}}{8} \right\rceil \cdot (N - N^{(1)}_{cs} - 2),$" and insert -- $n^{(2)}_{PUCCH} < N^{(2)}_{RB} N + \left\lceil \frac{N^{(1)}_{cs}}{8} \right\rceil \cdot (N - N^{(1)}_{cs} - 2)$ --.

Signed and Sealed this
Twenty-third Day of June, 2015

Michelle K. Lee
*Director of the United States Patent and Trademark Office*